(12) United States Patent
Park et al.

(10) Patent No.: US 12,193,099 B2
(45) Date of Patent: Jan. 7, 2025

(54) METHOD BY WHICH RELAY COMMUNICATION UE EFFICIENTLY SUPPORTS REMOTE UE IN CONFIGURATION UPDATE

(71) Applicant: LG Electronics Inc., Seoul (KR)

(72) Inventors: Sangmin Park, Seoul (KR); Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 366 days.

(21) Appl. No.: 17/789,387

(22) PCT Filed: Dec. 23, 2020

(86) PCT No.: PCT/KR2020/018961
§ 371 (c)(1),
(2) Date: Jun. 27, 2022

(87) PCT Pub. No.: WO2021/133047
PCT Pub. Date: Jul. 1, 2021

(65) Prior Publication Data
US 2023/0040140 A1    Feb. 9, 2023

(30) Foreign Application Priority Data

Dec. 27, 2019 (KR) ........................ 10-2019-0176378

(51) Int. Cl.
*H04W 76/23* (2018.01)
*H04W 8/22* (2009.01)
(Continued)

(52) U.S. Cl.
CPC ............. *H04W 76/23* (2018.02); *H04W 8/22* (2013.01); *H04W 60/04* (2013.01); *H04W 88/04* (2013.01); *H04W 92/18* (2013.01)

(58) Field of Classification Search
CPC ....... H04W 76/23; H04W 8/22; H04W 60/04; H04W 88/04; H04W 92/18
See application file for complete search history.

(56) References Cited

U.S. PATENT DOCUMENTS

| | | |
|---|---|---|
| 2019/0239132 A1 | 8/2019 | Wallentin et al. |
| 2019/0373647 A1 | 12/2019 | Rugeland et al. |
| 2019/0394816 A1 | 12/2019 | Kim |

FOREIGN PATENT DOCUMENTS

| | | | |
|---|---|---|---|
| WO | WO 2018128505 | 7/2017 | |
| WO | WO-2018128505 A1 * | 7/2018 | ............ H04W 48/08 |

(Continued)

OTHER PUBLICATIONS

Huawei et al., "Solution for Key Issue #3: Indirect Communication via UE-to-Network Relay UE," SA WG2 Meeting #136, S2-1912746, Reno, NV, USA, Nov. 18-22, 2019, 8 pages.

*Primary Examiner* — Saad A. Waqas
(74) *Attorney, Agent, or Firm* — Fish & Richardson P.C.

(57) ABSTRACT

One embodiment of the present specification relates to a method by which a relay UE performs communication, comprising the steps of: receiving, from an access and mobility management function (AMF), a UE configuration update command message including information for requesting registration of the relay UE; transmitting, to a remote UE, a message indicating suspension of a PC5 connection; receiving, from the remote UE, a message indicating that the PC5 connection has been completely suspended; transmitting, to the AMF, a UE configuration update complete message in response to the UE configuration update command message; performing a registration procedure with the AMF; and resuming the PC5 connection with the remote UE.

17 Claims, 18 Drawing Sheets

(51) Int. Cl.
*H04W 60/04* (2009.01)
*H04W 88/04* (2009.01)
*H04W 92/18* (2009.01)

(56) References Cited

FOREIGN PATENT DOCUMENTS

| WO | WO-2019215331 A1 | * | 11/2019 | ............ H04W 48/02 |
| WO | WO-2021092480 A1 | * | 5/2021 | .......... H04W 12/069 |

* cited by examiner

METHOD BY WHICH RELAY COMMUNICATION UE EFFICIENTLY SUPPORTS REMOTE UE IN CONFIGURATION UPDATE

CROSS-REFERENCE TO RELATED APPLICATIONS

This application is a National Stage application under 35 U.S.C. § 371 of International Application No. PCT/KR2020/018961, filed on Dec. 23, 2020, which claims the benefit of Korean Patent Application No. 10-2019-0176378, filed on Dec. 27, 2019. The disclosures of the prior applications are hereby incorporated by reference herein in their entirety.

The present specification relates to mobile communications.

BACKGROUND

With the success of long-term evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

For the 5G mobile communication, new radio access technology (new RAT or NR) has been researched.

The fifth-generation communication defined by the international telecommunication union (ITU) refers to providing a maximum data transmission speed of 20 Gbps and a maximum transmission speed of 100 Mbps per user in anywhere. It is officially called "IMT-2020" and aims to be released around the world in 2020.

SUMMARY

One aspect of the present specification is to provide smooth communication to a user using a relay UE.

For solving the above-mentioned problems, the relay UE may provide communication to the remote UE through a PC5 connection with the remote UE. The Relay UE may receive a message requesting registration from the network. In the process of registering the Relay UE to the network, the PC5 connection is interrupted. The Relay UE may transmit information about this PC5 interruption to the remote UE. After the relay UE completes the registration procedure, the relay UE may resume PC5 connection with the remote UE to resume communication.

The present specification may have various effects.

For example, through the procedure disclosed in this specification, even if the UEs using the UE to Network Relay in the 5G system are temporarily unable to operate the relay due to the re-registration of the relay UE, the user experience of the remote UE is improved. the user experience may be maintained above a certain level.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

DETAILED DESCRIPTION

Figure 1:
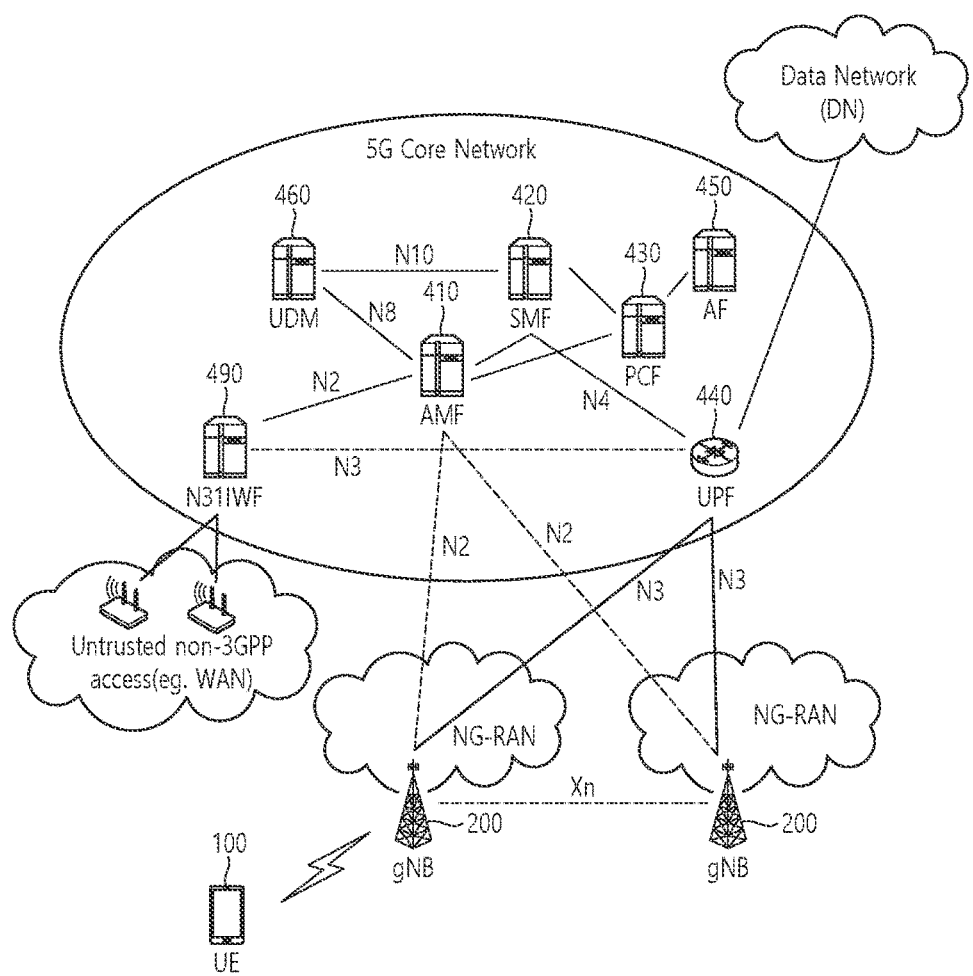
FIG. 1 is a structural diagram of a next-generation mobile communication.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly.

Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are individually described in one drawing in this specification may be implemented individually or simultaneously.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station communicating with a wireless device, and an evolved-NodeB (eNodeB), an evolved-NodeB (eNB), a BTS (Base Transceiver System), an access point (Access Point), may be called other terms such as gNB (Next generation NodeB).

I. Techniques and Procedures Applicable to the Disclosure of this Specification

FIG. 1 is a structural diagram of a next-generation mobile communication network.

5GC (5G Core) may include various components, and in FIG. 1, AMF (Access and Mobility Management Function) 410, SMF (Session Management Function) 420, and PCF (Policy Control) corresponding to some of them Function) 430, UPF (User Plane Function) 440, AF (Application Function) 450, UDM (Unified Data Management) 460, and N3IWF (Non-3GPP InterWorking Function) 490.

The UE 100 is connected to a data network via the UPF 440 through a Next Generation Radio Access Network (NG-RAN) including the gNB 20.

The UE 100 may receive a data service through untrusted non-3rd Generation Partnership Project (non-3GPP) access, for example, a wireless local area network (WLAN). To connect the non-3GPP access to the core network, an N3IWF 490 may be deployed.

The illustrated N3IWF 490 performs a function of managing interworking between non-3GPP access and 5G systems. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through the N3 interface for data transmission.

The illustrated AMF 410 may manage access and mobility in a 5G system. The AMF 410 may perform a function of managing Non-Access Stratum (NAS) security. The AMF 410 may perform a function of handling mobility in an idle state.

The illustrated UPF 440 is a type of gateway through which user data is transmitted and received. The UPF node 440 may perform all or part of the user plane functions of a Serving Gateway (S-GW) and a Packet Data Network Gateway (P-GW) of 4G mobile communication.

The UPF 440 is an element that operates as a boundary point between the next generation RAN (NG-RAN) and the core network, and maintains a data path between the gNB 20 and the SMF 420. Also, when the UE 100 moves over an area served by the gNB 20, the UPF 440 serves as a mobility anchor point. The UPF 440 may perform a function of handling PDUs. For mobility within NG-RAN (Next Generation-Radio Access Network defined after 3GPP Release-15), UPF packets can be routed. In addition, the UPF 440 is another 3GPP network (RAN defined before 3GPP Release-15, for example, UTRAN, E-UTRAN (Evolved-Universal Mobile Telecommunications System (UMTS) Terrestrial Radio Access Network)) or GERAN (GSM (GSM)). It may function as an anchor point for mobility with Global System for Mobile Communication/EDGE (Enhanced Data rates for Global Evolution) Radio Access Network). UPF 440 may correspond to a termination point of a data interface towards a data network.

The illustrated PCF 430 is a node that controls the operator's policy.

The illustrated AF 450 is a server for providing various services to the UE 100.

The illustrated UDM 460 is a kind of server that manages subscriber information, like a home subscriber server (HSS) of 4G mobile communication. The UDM 460 stores and manages the subscriber information in a Unified Data Repository (UDR).

The illustrated SMF 420 may perform a function of allocating an Internet Protocol (IP) address of the UE. In addition, the SMF 420 may control a protocol data unit (PDU) session.

For reference, in the following AMF (410), SMF (420), PCF (430), UPF (440), AF (450), UDM (460), N3IWF (490), gNB (20), or UE (100) Reference numerals for may be omitted.

5G mobile communication supports multiple numerology or subcarrier spacing (SCS) to support various 5G services. For example, when SCS is 15 kHz, it supports a wide area in traditional cellular bands, and when SCS is 30 kHz/60 kHz, dense-urban, lower latency and wider carrier bandwidth, and when SCS is 60 kHz or higher, a bandwidth greater than 24.25 GHz to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band.

Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
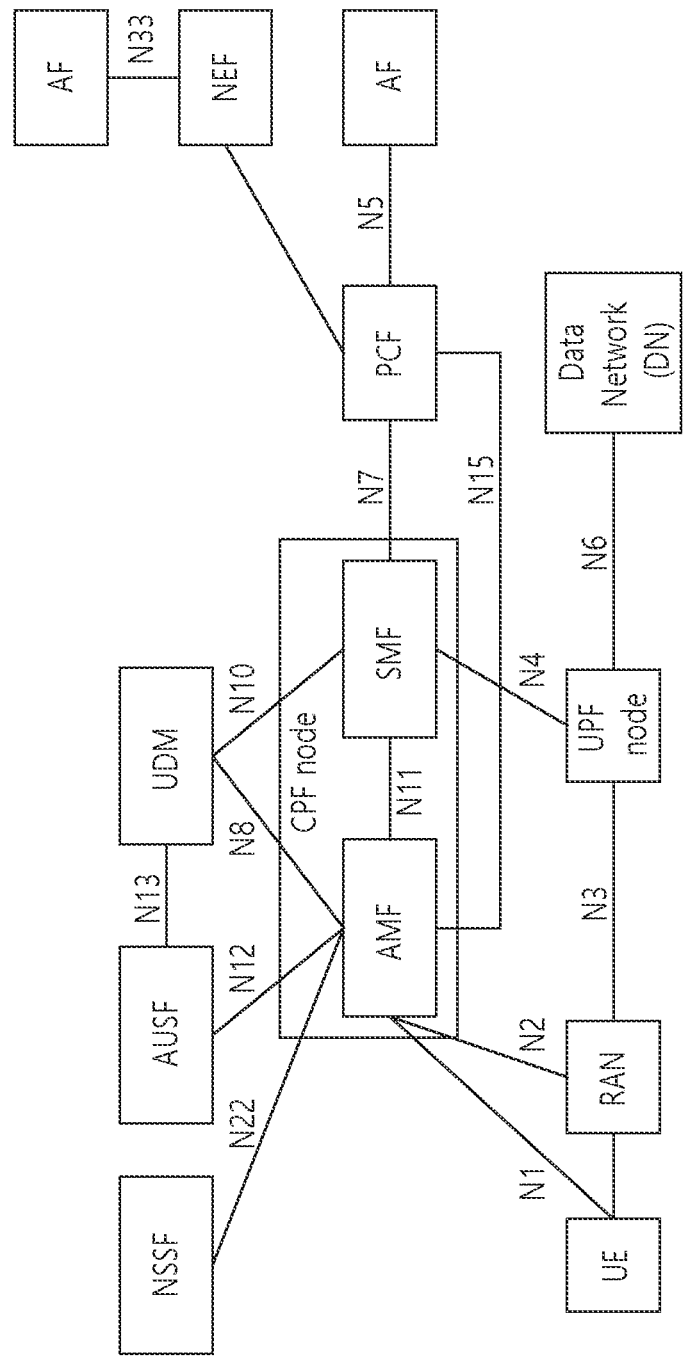
FIG. 2 is an exemplary diagram illustrating an expected structure of next-generation mobile communication from the viewpoint of a node.

FIG. 2 is an exemplary diagram illustrating an expected structure of next-generation mobile communication from the viewpoint of a node.

As can be seen with reference to FIG. 2, the UE is connected to a data network (DN) through a next-generation RAN (Radio Access Network).

The illustrated control plane function (CPF) node carries out all or part of the functions of the MME (Mobility Management Entity) of the 4th generation mobile communication, and out all or part of the control plane functions of a Serving Gateway (S-GW) and a PDN Gateway (P-GW). The CPF node includes an Access and Mobility Management Function (AMF) and a Session Management Function (SMF).

The illustrated User Plane Function (UPF) node is a type of gateway through which user data is transmitted and received. The UPF node may perform all or part of the user plane functions of the S-GW and P-GW of 4G mobile communication.

The illustrated PCF (Policy Control Function) is a node that controls the operator's policy.

The illustrated application function (Application Function: AF) is a server for providing various services to the UE.

The illustrated unified data management (UDM) is a kind of server that manages subscriber information, like a home subscriber server (HSS) of 4G mobile communication. The UDM stores and manages the subscriber information in a Unified Data Repository (UDR).

The illustrated Authentication Server Function (AUSF) authenticates and manages the UE.

The illustrated network slice selection function (NSSF) is a node for network slicing as will be described later.

The illustrated Network Exposure Function (NEF) is a node for providing a mechanism for securely exposing the services and functions of the 5G core. For example, NEF may expose functions and events, may securely provide information from external applications to the 3GPP network, may translate internal/external information, may provide control plane parameters, and may manage packet flow description (PFD).

Figure 3:
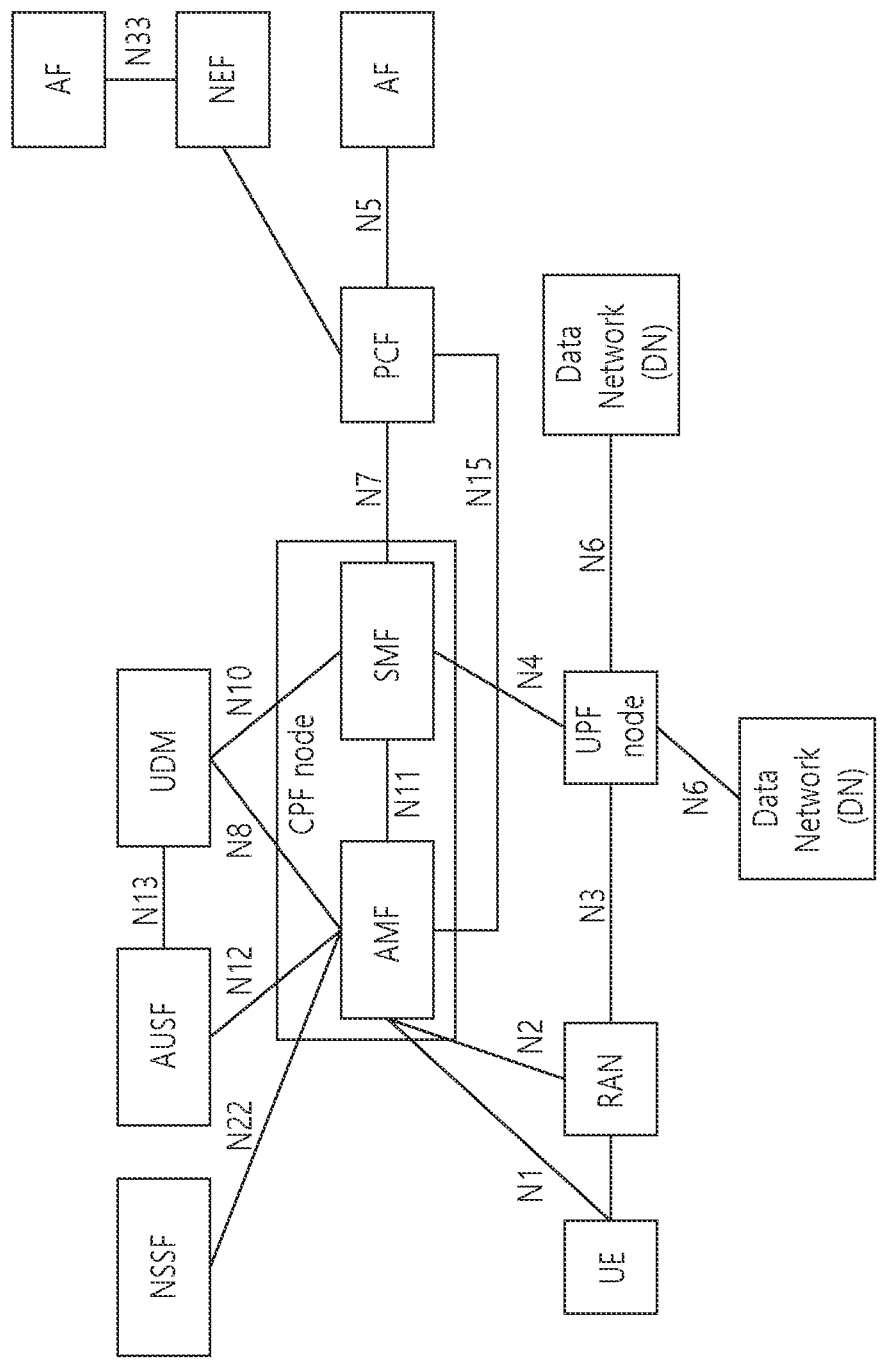
FIG. 3 is an exemplary diagram illustrating an architecture for supporting simultaneous access to two data networks.

In FIG. 3, a UE may simultaneously access two data networks using multiple PDU (protocol data unit or packet data unit) sessions.

FIG. 3 is an exemplary diagram illustrating an architecture for supporting simultaneous access to two data networks.

FIG. 3 shows an architecture for a UE to simultaneously access two data networks using one PDU session.

Reference points shown in FIGS. 2 and 3 are as follows.

N1 represents a reference point between the UE and the AMF.

N2 represents a reference point between (R)AN and AMF.

N3 represents the reference point between (R)AN and UPF.

N4 represents a reference point between SMF and UPF.

N5 represents the reference point between PCF and AF.

N6 represents a reference point between UPF and DN.

N7 represents a reference point between SMF and PCF.

N8 represents a reference point between UDM and AMF.

N9 represents a reference point between UPFs.

N10 represents a reference point between the UDM and the SMF.

N11 represents a reference point between AMF and SMF.

N12 represents a reference point between AMF and AUSF.

N13 represents a reference point between UDM and AUSF.

N14 represents a reference point between AMFs.

N15 represents a reference point between the PCF and the AMF in a non-roaming scenario, and a reference point between the AMF and the PCF of a visited network in a roaming scenario.

N16 represents a reference point between SMFs.

N22 represents a reference point between the AMF and the NSSF.

N30 represents a reference point between the PCF and the NEF.

N33 denotes a reference point between AF and NEF.

For reference, in FIGS. 2 and 3, AF by a third party other than an operator may be connected to 5GC through NEF.

Figure 4:
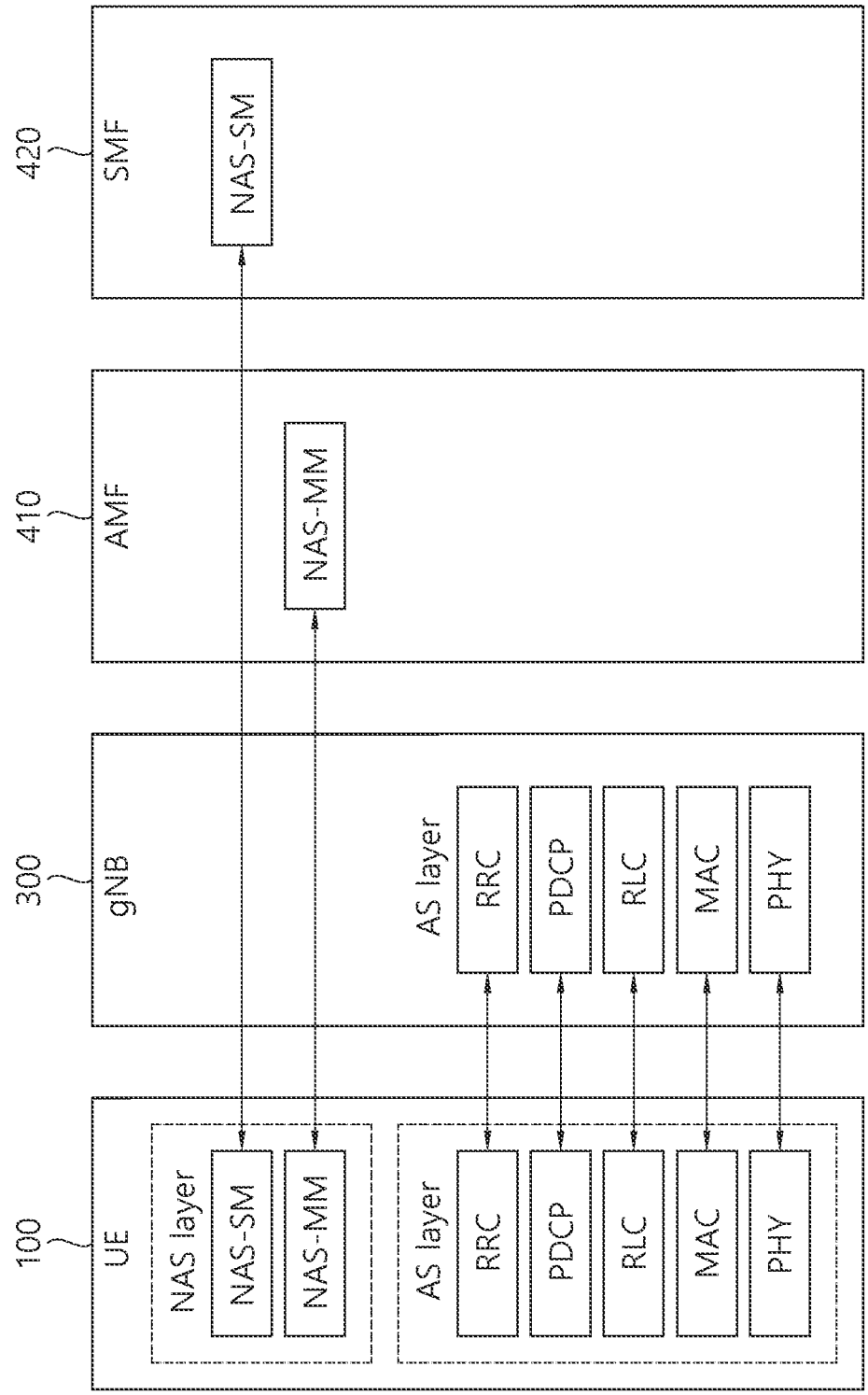
FIG. 4 is another exemplary diagram showing the structure of a radio interface protocol (Radio Interface Protocol) between the UE and the gNB.

FIG. 4 is another exemplary diagram showing the structure of a radio interface protocol (Radio Interface Protocol) between the UE and the gNB.

The radio interface protocol is based on the 3GPP radio access network standard. The air interface protocol is horizontally composed of a physical layer, a data link layer, and a network layer, and vertically a user plane for data information transmission and control. It is divided into a control plane for signal transmission.

The protocol layers can be distinguished to L1 (first layer), L2 (second layer), and L3 (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. And, data is transferred between different physical layers, that is, between the physical layers of the transmitting side and the receiving side through a physical channel.

The second layer includes a Medium Access Control (MAC) layer, a Radio Link Control (RLC) layer, and a Packet Data Convergence Protocol (PDCP) layer.

The third layer includes radio resource control (hereinafter abbreviated as RRC). The RRC layer is defined only in the control plane and is responsible to control logical channels, transport channels and physical channels related to the establishment (establishment), re-establishment (Re-establishment) and release (Release) of radio bearers (Radio Bearer; abbreviated as RB). In this case, the RB means a service provided by the second layer for data transfer between the UE and the E-UTRAN.

The NAS (Non-Access Stratum) layer performs functions such as connection management (session management) and mobility management (Mobility Management).

The NAS layer is divided into a NAS entity for MM (Mobility Management) and a NAS entity for SM (session management).

1) The NAS entity for MM provides the following general functions.

NAS procedures related to AMF, including the following.

Registration management and access management procedures. AMF supports the following functions.

Secure NAS signal connection between UE and AMF (integrity protection, encryption)

2) The NAS entity for SM performs session management between the UE and the SMF.

SM signaling messages are processed, i.e., generated and processed in the NAS-SM layer of the UE and SMF. The content of the SM signaling message is not interpreted by the AMF.

In case of SM signaling transmission,

The NAS entity for MM creates a NAS-MM message that derives how and where to forward the SM signaling message with a security header indicating the NAS transmission of the SM signaling, additional information about the receiving NAS-MM.

Upon reception of SM signaling, the NAS entity for SM performs an integrity check of the NAS-MM message, and interprets additional information to derive a method and a place to derive the SM signaling message.

Meanwhile, in FIG. 4, the RRC layer, the RLC layer, the MAC layer, and the PHY layer located below the NAS layer are collectively referred to as an access layer (Access Stratum: AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

Figure 5A:
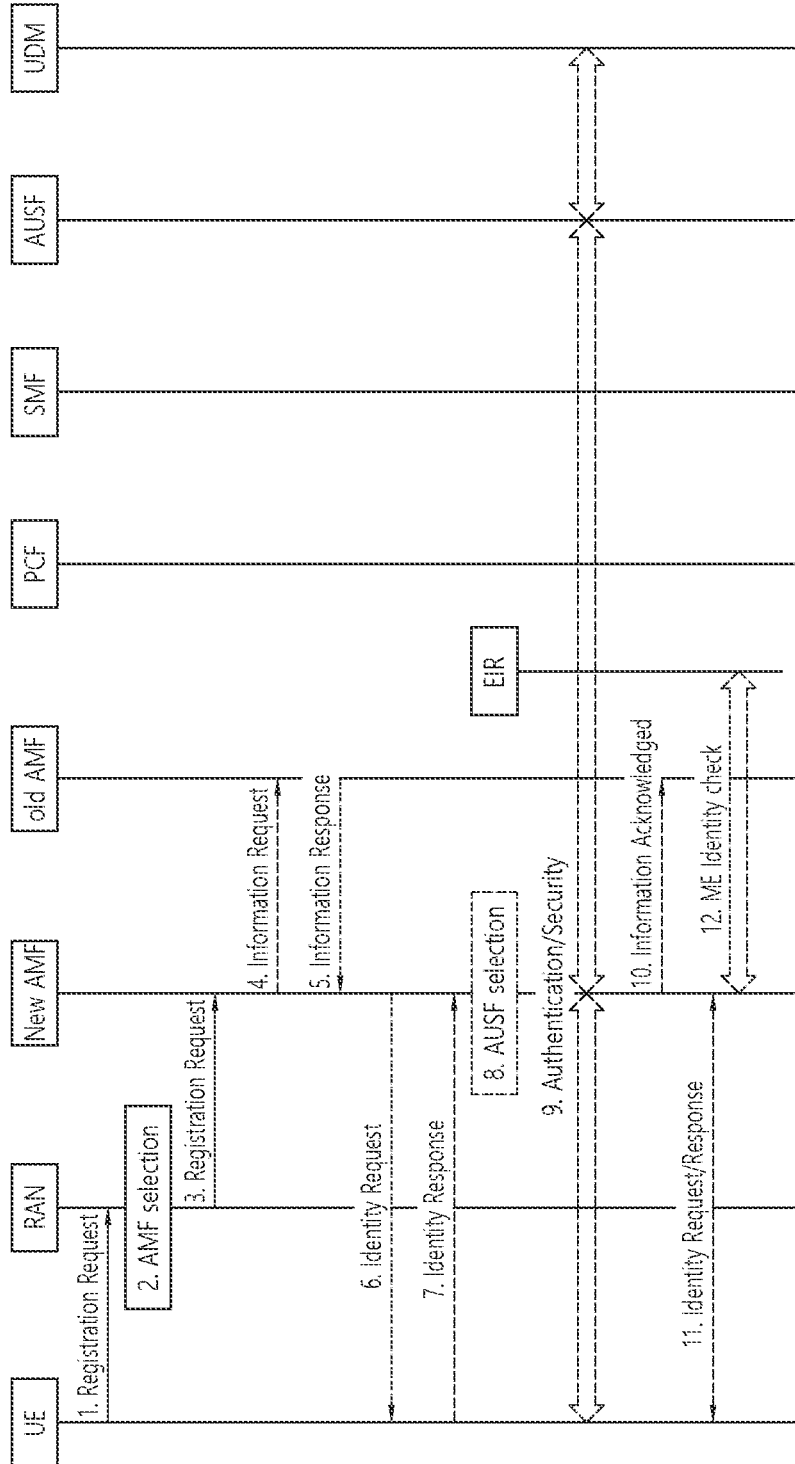
FIG. 5a and FIG. 5b are signal flow diagrams illustrating an exemplary registration procedure.
Figure 5B:
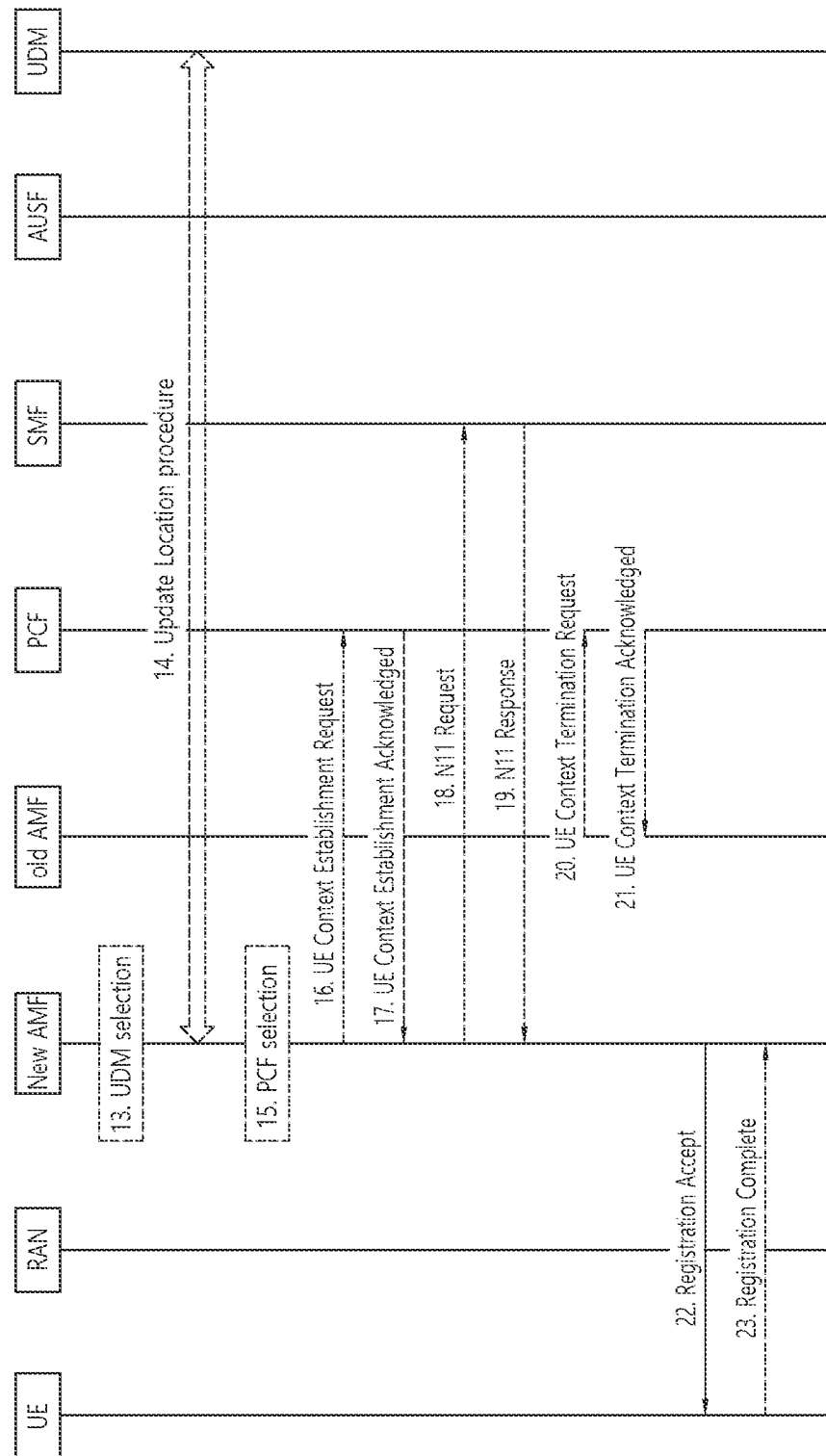

FIG. 5a and FIG. 5b are signal flow diagrams illustrating an exemplary registration procedure.

First, steps 1 to 12 are described in FIG. 5a.

1) The UE may send an AN message to the RAN. The AN message may include an AN parameter and a registration request message. The registration request message may include information such as registration type, subscriber permanent ID or temporary user ID, security parameters, network slice selection assistance information (NSSAI), 5G capability of the UE, protocol data unit (PDU) session state, and the like.

In the case of 5G RAN, the AN parameters may include a Subscription Permanent Identifier (SUPI) or a temporary user ID, a selected network, and an NSSAI.

The registration type is "initial registration" (i.e. the UE is in a non-registered state), "Mobility registration update" (i.e. the UE is in a registered state and initiates the registration procedure due to mobility) or "Regular registration update" (That is, the UE is in the registered state and starts the registration procedure due to the expiration of the periodic update timer). When the temporary user ID is included, the temporary user ID indicates the last serving AMF. If the UE is already registered via non-3GPP access in a PLMN different from the Public Land Mobile Network (PLMN) of 3GPP access, the UE may not provide the temporary ID of the UE assigned by the AMF during the registration procedure via non-3GPP access.

Security parameters can be used for authentication and integrity protection.

The PDU session state may indicate a (previously established) PDU session usable in the UE.

2) If SUPI is included or the temporary user ID does not indicate a valid AMF, the RAN may select an AMF based on (R)AT and NSSAI.

If the (R)AN cannot select an appropriate AMF, it selects an arbitrary AMF according to a local policy, and transmits a registration request to the selected AMF. If the selected AMF cannot service the UE, the selected AMF selects another more suitable AMF for the UE.

3) The RAN transmits an N2 message to the new AMF. The N2 message includes an N2 parameter and a registration request. The registration request may include registration type, subscriber permanent identifier or temporary user ID, security parameters, NSSAI and MICO mode default settings, and the like.

When 5G-RAN is used, the N2 parameter includes location information related to the cell in which the UE is camping, a cell identifier, and a RAT type.

If the registration type indicated by the UE is periodic registration update, steps 4 to 17 to be described later may not be performed.

4) The newly selected AMF may transmit an information request message to the previous AMF.

If the temporary user ID of the UE is included in the registration request message and the serving AMF has changed since the last registration, the new AMF may send an information request message containing the complete registration request information to the old AMF to request the SUPI and MM context of the UE.

5) The previous AMF transmits an information response message to the newly selected AMF. The information response message may include SUPI, MM context, and SMF information.

Specifically, the previous AMF sends an information response message including the UE's SUPI and MM context.

If the previous AMF has information on the active PDU session, the previous AMF may include SMF information including the ID of the SMF and the PDU session ID in the information response message.

6) The new AMF sends an Identity Request message to the UE if the SUPI is not provided by the UE or retrieved from the previous AMF.

7) The UE transmits an Identity Response message including the SUPI to the new AMF.

8) AMF may decide to trigger AUSF. In this case, the AMF may select the AUSF based on the SUPI.

9) AUSF may initiate authentication of UE and NAS security functions.

10) The new AMF may transmit an information response message to the previous AMF.

If the AMF is changed, the new AMF may transmit the information response message to confirm delivery of the UE MM context.

If the authentication/security procedure fails, registration is rejected and the new AMF can send a rejection message to the old AMF.

11) The new AMF may transmit an Identity Request message to the UE.

If the PEI was not provided by the UE or was not retrieved from the previous AMF, an Identity Request message may be sent for the AMF to retrieve the PEI.

12) The new AMF checks the ME identifier.

FIG. 5b illustrates Steps 13 to 23.

13) If step 14 to be described later is performed, the new AMF selects a UDM based on SUPI.

14) If the AMF is changed after the last registration, there is no valid subscription context for the UE in the AMF, or the UE provides a SUPI that does not refer to a valid context in the AMF, the new AMF starts the Update Location procedure. Alternatively, it may be started even when the UDM starts the location cancellation (Cancel Location) for the previous AMF. The old AMF discards the MM context and notifies all possible SMF(s), and the new AMF creates the MM context for the UE after obtaining the AMF related subscription data from the UDM.

When network slicing is used, the AMF obtains the allowed NSSAI based on the requested NSSAI, UE subscription and local policy. Reroute registration requests if AMF is not eligible to support allowed NSSAI.

15) The new AMF may select a PCF based on SUPI.

16) The new AMF transmits a UE Context Establishment Request message to the PCF. The AMF may request an operator policy for the UE from the PCF.

17) The PCF transmits a UE Context Establishment Acknowledged message to the new AMF.

18) The new AMF transmits an N11 request message to the SMF.

Specifically, when the AMF is changed, the new AMF notifies each SMF of the new AMF serving the UE. The AMF verifies the PDU session state from the UE with the available SMF information. When the AMF is changed, available SMF information may be received from the previous AMF. The new AMF may request the SMF to release the network resources related to the PDU session not active in the UE.

19) The new AMF transmits an N11 response message to the SMF.

20) The previous AMF transmits a UE Context Termination Request message to the PCF.

If the previous AMF has previously requested that the UE context be established in the PCF, the old AMF may delete the UE context from the PCF.

21) The PCF may transmit a UE Context Termination Request message to the previous AMF.

22) The new AMF transmits a registration accept message to the UE. The registration acceptance message may include temporary user ID, registration area, mobility restriction, PDU session status, NSSAI, regular registration update timer, and allowed MICO mode.

The registration accept message may include information of the allowed NSSAI and the mapped NSSAI. The allowed NSSAI information for the access type of the UE may be included in the N2 message including the registration accept message. The mapped NSSAI information is information that maps each S-NSSAI of the allowed NSSAI to the S-NASSI of the NSSAI configured for HPLMN.

When the AMF allocates a new temporary user ID, the temporary user ID may be further included in the registration acceptance message. When the mobility restriction is applied to the UE, information indicating the mobility restriction may be additionally included in the registration accept message. The AMF may include information indicating the PDU session state for the UE in the registration accept message. The UE may remove any internal resources associated with a PDU session not marked as active in the received PDU session state. If the PDU session state information is in the Registration Request message, the AMF may include information indicating the PDU session state to the UE in the registration accept message.

23) The UE transmits a registration complete message to the new AMF.

<D2D (Device to Device) Communication>

On the other hand, hereinafter, D2D communication will be described.

Figure 6:
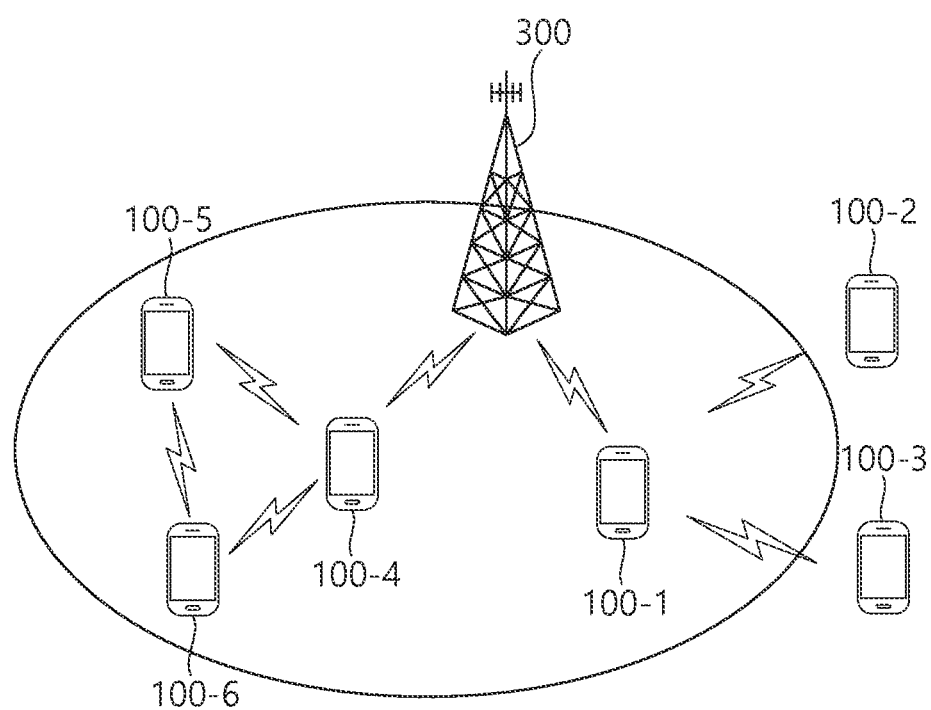
FIG. 6 shows an example of the concept of D2D (Device to Device) communication.

FIG. 6 shows an example of the concept of D2D (Device to Device) communication.

Due to an increase in user requirements for a social network service (SNS), communication between UEs in a physically close distance, that is, device to device (D2D) communication, is required.

In order to reflect the above requirements, as shown in FIG. 6, between UE #1 (100-1), UE #2 (100-2), UE #3 (100-3) or UE #4 (100-4), UE #5 (100-5), and UE #6 (100-6) are discussing a method for directly communicating without the intervention of the base station 200 between. Of course, it is possible to communicate directly between the UE #1 100-1 and the UE #4 100-4 with the help of the base station 200. Meanwhile, UE #4 100-4 may serve as a relay for UE #5 100-5 and UE #6 100-6. Similarly, UE #1100-1 may serve as a repeater for UE #2100-2 and UE #3100-3 that are far away from the cell center.

On the other hand, D2D communication is also called a proximity service (Proximity Service: ProSe). In addition, a UE performing a proximity service is also referred to as a ProSe UE. A link between UEs used for the D2D communication is also called a sidelink.

The physical channels used for the sidelink include the following.

PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

In addition, there are the following physical signals used in the side link.

Demodulation Reference signal (DMRS)
Sidelink Synchronization signal (SLSS)

The SLSS includes a primary sidelink synchronization signal (PSLSS) and a secondary sidelink synchronization signal (Secondary SLSS: SSLSS).

Figure 7:
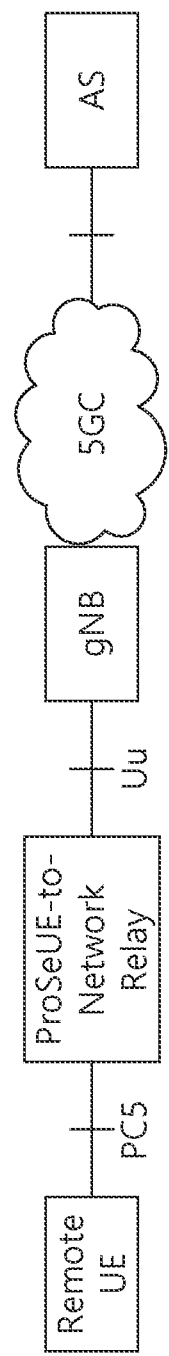
FIG. 7 shows an example architecture of a UE-to-Network Relay.
Figure 8:
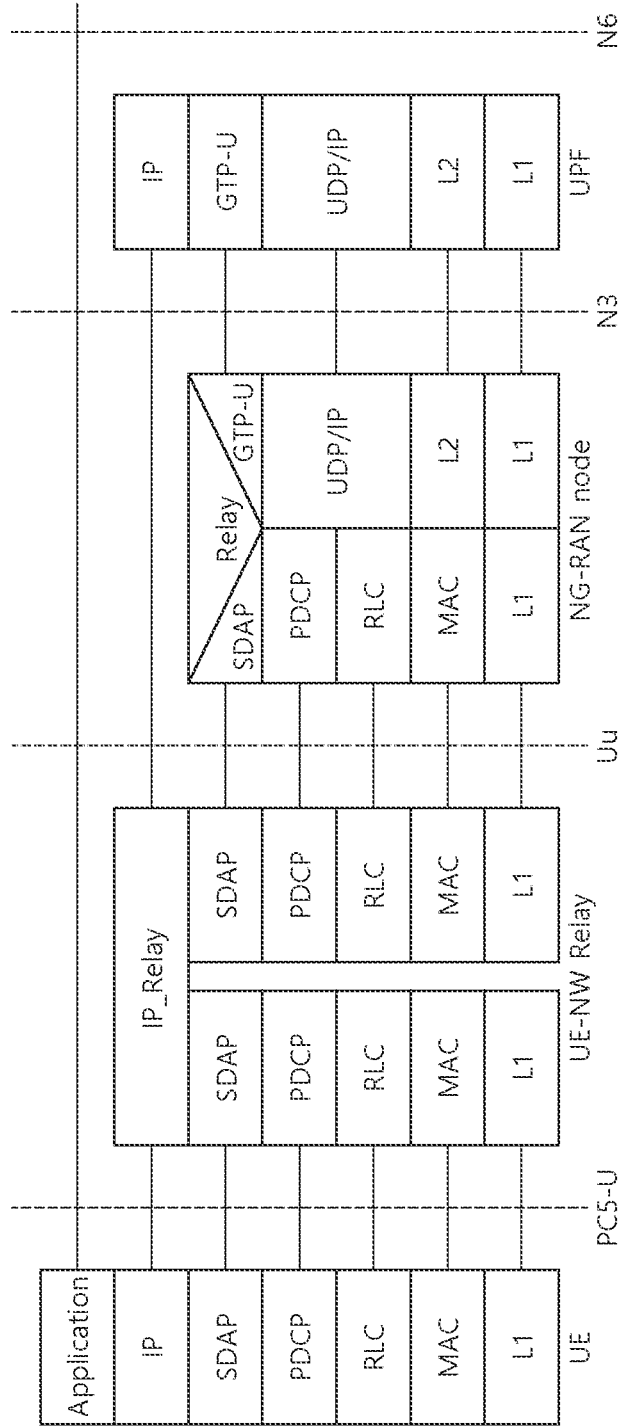
FIG. 8 shows an example of a protocol stack for UE-to-Network Relay.

FIG. 7 shows an example architecture of a UE-to-Network Relay. FIG. 8 shows an example of a protocol stack for UE-to-Network Relay.

Referring to FIG. 7, UE-to-network relay (UE-to-Network Relay) supports the network connection of the remote (Remote) UE.

The PC5 link is the interface between the UE and the UE-to-network relay. The Uu link is the interface between the UE-to-network relay and the base station.

If the UE has established a PC5 link with the UE-to-network relay, the UE is considered a remote UE.

The 5G ProSe UE-to-Network Relay entity (refer to 5G ProSe UE-to-Network Relay in FIG. 7) may provide a function for supporting network connectivity for Remote UEs. UE-to-Network Relay may be used for both public safety services and commercial services (e.g. interactive services).

When a UE (e.g. Remote UE) has successfully established a PC5 link to a 5G ProSe UE-to-Network Relay, the UE (e.g. Remote UE) may be considered a Remote UE for a specific 5G ProSe UE-to-Network Relay. The Remote UE may be located within NG-RAN coverage or may be located outside NG-RAN coverage.

5G ProSe UE-to-Network Relay may relay unicast traffic (UL and DL traffic) between the Remote UE and the network. The 5G ProSe UE-to-Network Relay shall provide a general function to relay all IP traffic.

For unicast traffic between Remote UEs and 5G ProSe UE-to-Network Relays, One-to-one Direct Communication may be used. The protocol stack of FIG. 9 described above may be a protocol stack for Layer-3 UE-to-Network Relay.

Hop-by-hop security can be supported on PC5 links and Uu links. If there is a requirement beyond hop-by-hop security to protect the traffic of the Remote UE, security through the IP layer may be applied.

In this case, when the remote UE maintains both the PC5 link and the Uu link, the network core entity connected to the Uu link may not be aware of the existence of the PC5 link toward the UE-to-network relay.

Communication between the remote UE and the UE-to-Network Relay is performed as one-to-one direct communication.

<Update UE Configuration>

1. General

The UE configuration may be updated by the network at any time using the UE configuration update procedure. UE configuration includes:

Access and mobility management related parameters are determined and provided by AMF. This includes mapping to configured NSSAI and subscribed S-NSSAI, mapping to allowed NSSAI and subscribed S-NSSAI, service gap time, PLMN assigned UE radio function ID, PLMN assigned UE radio function ID deletion indication. And if the UE configuration update procedure is triggered by the AMF after network slice specific authentication and approval of the S-NSSAI, the list of rejected NSSAIs is also included.

UE policy provided by PCF.

When the AMF wants to change the UE configuration for access and mobility management related parameters, the AMF initiates the procedure defined in clause 2. When the PCF wants to change or provide a new UE policy in the UE, the PCF initiates a procedure.

If the UE configuration update procedure requires the UE to initiate the registration procedure, the AMF indicates this explicitly to the UE.

The procedure in clause 2 can also be triggered when the AAA server that has performed network slice-specific authentication and authorization for S-NSSAI revokes authorization.

2. UE Configuration Update Procedure for Access and Mobility Management Related Parameters This procedure is initiated by the AMF when it wants to update the access and mobility management related parameters in the UE configuration.

This procedure also includes the mobility registration update procedure while the UE is in the CM-CONNECTED state to modify NAS parameters that require negotiation (e.g. MICO mode), the mobility registration update procedure after the UE enters the CM-IDLE state, or the network Used to trigger the UE to perform an indication based (e.g. in case of an allowed NSSAI change requiring re-registration). When a registration procedure is required, the AMF provides an indication to the UE to initiate the registration procedure.

The UE configuration update is sent via the access type to which the UE configuration update applies, if applicable (i.e. 3GPP access or non-3GPP access). If AMF wants to update NAS parameters on a UE that requires UE acknowledgment, AMF provides an indication to the UE whether the UE should acknowledge the command or not. The AMF should not request approval of the NITZ order. The AMF shall request approval for NSSAI information (e.g. allowed NSSAI), 5G-GUTI, TAI list and mobility restrictions, LADN information, MICO, operator-defined access category definitions, PLMN-assigned UE radio function IDs, and SMS subscriptions.

Figure 9:
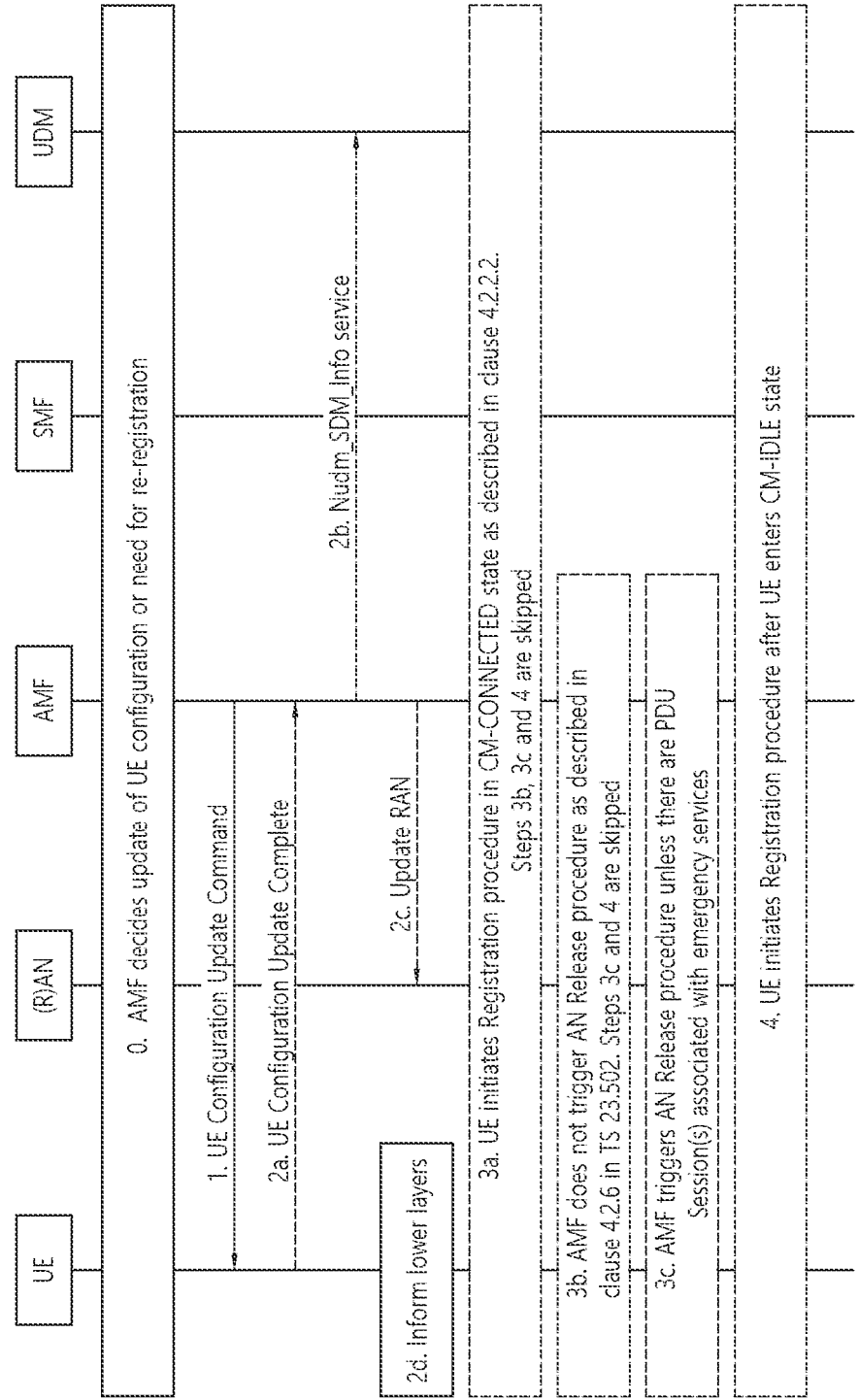
FIG. 9 shows an example UE configuration update procedure for access and mobility management related parameters.

FIG. 9 shows an example UE configuration update procedure for access and mobility management related parameters.

0) AMF determines the need to change UE configuration due to various reasons (e.g. UE mobility change, NW policy, receiving subscriber data update notification in UDM, network slice configuration change, PLMN allocation UE radio capacity ID allocation required). Or the AMF determines whether the UE should perform the registration procedure. When the UE is in CM-IDLE, the AMF may wait until the UE enters the CM-CONNECTED state or trigger a Network Triggered Service Request.

Note 1: It is up to the network implementation whether the AMF can wait for the UE to enter the CM-CONNECTED state or trigger a network-triggered service request.

NOTE 2: AMF can use the Nnssf_NSSelection_Get service operation to determine whether a network slice configuration needs to be updated, in which case the AMF compares the stored information with the output of the NSSF to determine whether a UE update is required.

The AMF may include a mobility restriction list (Mobility Restriction List) in the N2 message for delivering the UE configuration update command to the UE when the service area restriction for the UE is updated.

1) The AMF is configured for one or more UE parameters (configuration update indication, 5G-GUTI, TAI list, allowed NSSAI, mapping of allowed NSSAI, configured NSSAI for serving PLMN, mapping of configured NSSAI, rejected S-NSSAI, NITZ, mobility restrictions, LADN information, MICO, operator-defined access category definitions, PLMN assigned UE radio function ID, SMS subscription indication, [PLMN assigned UE radio function ID deletion indication]). Optionally, the AMF may update the rejected S-NSSAI in the UE configuration update command.

AMF includes 5G-GUTI, TAI list, allowed NSSAI, allowed NSSAI mapping, NSSAI configured to provide PLMN, configured NSSAI mapping, denied S-NSSAI, NITZ (network ID and time zone), mobility restriction parameters, LADN information, operator-defined access category definitions, PLMN assigned UE radio function IDs, or SMS subscription indications if AMF wants to update these NAS parameters without triggering a UE registration procedure.

AMF may also include a configuration update indication parameter in the UE configuration update command indicating:

Whether a Network Slicing subscription change has occurred.
Whether the UE should accept the command.
Whether the registration process has been requested.

If the AMF indicates a Network Slicing Subscription Change, the UE shall locally delete all network slicing settings for all PLMNs and, if applicable, update the settings for the current PLMN based on the received information. If the AMF indicates Network Slicing Subscription Change, the UE shall request confirmation in step 2.

2a) When the UE configuration update indication requires approval of the UE configuration update command, the UE shall send a UE configuration update complete message to the AMF. The AMF shall request approval for all UE configuration updates, except in cases where only NITZ is provided. Skip steps 3a, 3b, 3c and 4 if no registration process is required. If the UE Configuration Update Command message contains a Configuration Update Indication and a registration procedure is required, according to other NAS parameters included in the UE Configuration Update command, the UE If so, steps 3a or 3b or 3c+4 should be executed.

If the UE Radio Capability ID assigned by the PLMN is included in step 1, the AMF stores the UE Radio Capability ID in the UE context upon receiving the UE Configuration Update complete message.

When the UE receives a PLMN-assigned UE Radio Capability ID deletion indication in step 1, the UE determines the PLMN-assigned UE radio capability ID(s) for this PLMN (the PLMN-assigned UE Radio Capability ID(s)) must be deleted. If updating UE settings is for this purpose only, skip the next step.

2b) [optional] The AMF also uses the Nudm_SDM_Info service action to acknowledge to the UDM that the UE has received a Network Slicing Subscription Change Indication (if indicated in step 1) and has taken action accordingly.

2c) [Optional] If AMF reconfigures 5G-GUTI via 3GPP access, AMF sends new UE Identity Index Value (derived from new 5G-GUTI) to NG-RAN when AMF receives acknowledgment from UE in step 2a notify to

[Optional] If the UE is registered in the same PLMN through 3GPP and non-3GPP access, if AMF reconfigures 5G-GUTI through non-3GPP access, and if the UE is in CM-CONNECTED state through 3GPP access, AMF notifies the NG-RAN of the new UE Identity Index Value (derived from the new 5G-GUTI) in step 2a when the AMF receives an acknowledgment from the UE.

[Optional] If the AMF sets the UE with the UE Radio Capability ID assigned by the PLMN, the AMF informs the NG-RAN of the UE Radio Capability ID upon receiving an acknowledgment from the UE in step 2a.

2d) [optional] If the UE is configured with a new 5G-GUTI in step 2a via non-3GPP access and the UE is registered to the same PLMN via 3GPP and non-3GPP access, then the UE transmits the new 5G-GUTI to a lower layer of 3GPP access.

If the UE is configured with a new 5G-GUTI in step 2a through 3GPP access, the UE delivers the new 5G-GUTI to a lower layer of 3GPP access.

Note 3: Steps 2c and 2d are necessary because the NG-RAN can use the RRC inactive state and a part of the 5G-GUTI is used to calculate the paging frame. It is assumed that UE Configuration Update Complete is stably transmitted to AMF after confirming reception to the UE.

3a) If only NAS parameters that can be updated without switching from CM-IDLE are included (e.g. MICO mode), the UE initiates the registration process immediately after acknowledgment to renegotiate the updated NAS parameter(s) with the network Should be. Steps 3b, 3c and 4 are skipped.

3b) New allowed NSSAI and/or new mapping of allowed NSSAI and/or new configured NSSAI provided by AMF to UE affect existing connections to slices (i.e., all S-NSSAI(s) connected to UE) If not, the AMF does not need to release the NAS signaling connection to the UE after getting approval in step 2, and there is no need for immediate registration. The UE may immediately start using the new Allowed NSSAI and/or the mapping of the new Allowed NSSAI. The UE cannot connect to the S-NSSAI contained in the new established NSSAI for the serving PLMN, but the S NSSAI will not be able to connect to the new Not included in the accepted NSSAI.

3c) If the new allowed NSSAI and/or the new mapping of the allowed NSSAI and/or the new configured NSSAI provided by the AMF to the UE affect the persistent existing connection to the network slice, the AMF shall also inform the UE configuration update command message. If possible, include the relevant mapping of the newly allowed NSSAI.

If the AMF cannot determine a new Allowed NSSAI after the Subscribed S-NSSAI(s) is updated, the AMF does not include the Allowed NSSAI in the UE Configuration Update Command message. The AMF provides an indication that the UE should initiate the registration procedure. After receiving approval in step 2, the AMF shall release the NAS signaling connection to the UE unless there is one established PDU session related to the regulatory priority service. If there is one established PDU session associated with the regulated priority service, the AMF informs the SMF to release the PDU session associated with the non-regulated priority service for this UE.

The AMF shall reject the NAS message from the UE conveying the PDU session establishment request for the non-emergency PDU session before the necessary registration procedure is successfully completed by the UE.

4) After entering the CM-IDLE state, the UE initiates the appropriate registration procedure and does not include 5G-S-TMSI or GUAMI in Access Stratum signaling. If a PDU session related to the emergency service is established and the UE receives an instruction to perform the registration procedure, the UE shall start the registration procedure only after the PDU session related to the emergency service is released.

Note 4: Receiving a UE configuration update command without an indication requesting re-registration may trigger the registration procedure by the UE for other reasons.

II. Problems to be Solved by the Disclosure of this Specification

As such, in the case of Prose communication, a specific UE may operate as a Proximity Services (Prose) Relay. There may be a case in which data or signaling is being transmitted to one or more remote UEs through a relay UE that actively relays in this way.

The network may request re-registration from the relay UE. When the network requests a UE Configuration Update (UCU) procedure including "registration requested" information from the relay UE, the relay UE may disconnect the NAS signaling connection and may perform transition to an idle mode. However, when the user plane resource of the PDU session being directly used by the relay UE is allocated (or activated), the NAS signaling connection may be maintained by delaying the NAS signaling connection release.

For re-registration of the relay UE according to the registration request of the network, the relay UE may perform transition the CM state to the idle mode, and accordingly, the data/signaling transmission of the remote UE(s) transmitted through the relay UE may also be discontinued by force. In this case, a problem such as data/signaling loss may occur due to sudden interruption, and the user of the remote UE may feel inconvenience.

And after the re-registration procedure of the relay UE (re-registration), the remote UE must perform the PC5 connection/configuration procedure with the relay UE for the interrupted data/signaling retransmission. In addition, from the time the re-registration procedure ends, a time difference occurs while the remote UE recognizes that the relay UE is available, then the remote UE establish a connection through the relay UE again. End-to-end relay of remote UE is increased. This causes a problem of deteriorating the user experience of the remote UE.

In the disclosure of the present specification, a method for solving problems such as the examples described above is proposed.

III. Disclosure of the Present Specification

The disclosures described below in this specification may be implemented in one or more combinations. Each of the drawings shows an embodiment of each disclosure, but the embodiments of the drawings may be implemented in combination with each other.

Conventionally, communication of the remote terminal may be interrupted due to the re-registration procedure of the relay terminal. In order to solve this situation, the following disclosures may be implemented in one or more combinations.

The method of efficiently supporting UE configuration update of a remote UE proposed in the present specification may be configured by a combination of one or more of the following operations/configurations/steps. For reference, the UE (User Equipment) and UE are mixed and explained. In addition, UE-to-Network Relay, ProSe UE-to-Network Relay, Relay, Relay UE, UE-NW Relay, eRelay, eRelay UE, eRelay-UE, ProSe Relay, and ProSe Relay UE are mixed and used. In addition, Remote UE, eRemote UE, eRemote-UE, ProSe Remote UE, and ProSe Remote may be mixed and used.

The proposed method may be applicable to various services, such as eMBB, V2X, Public Safety, and IoT. PC5 may refer to only NR PC5, or may refer to both NR PC5 and LTE PC5. NG-RAN may refer to only gNB, or may refer to both gNB and ng-eNB.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 10:
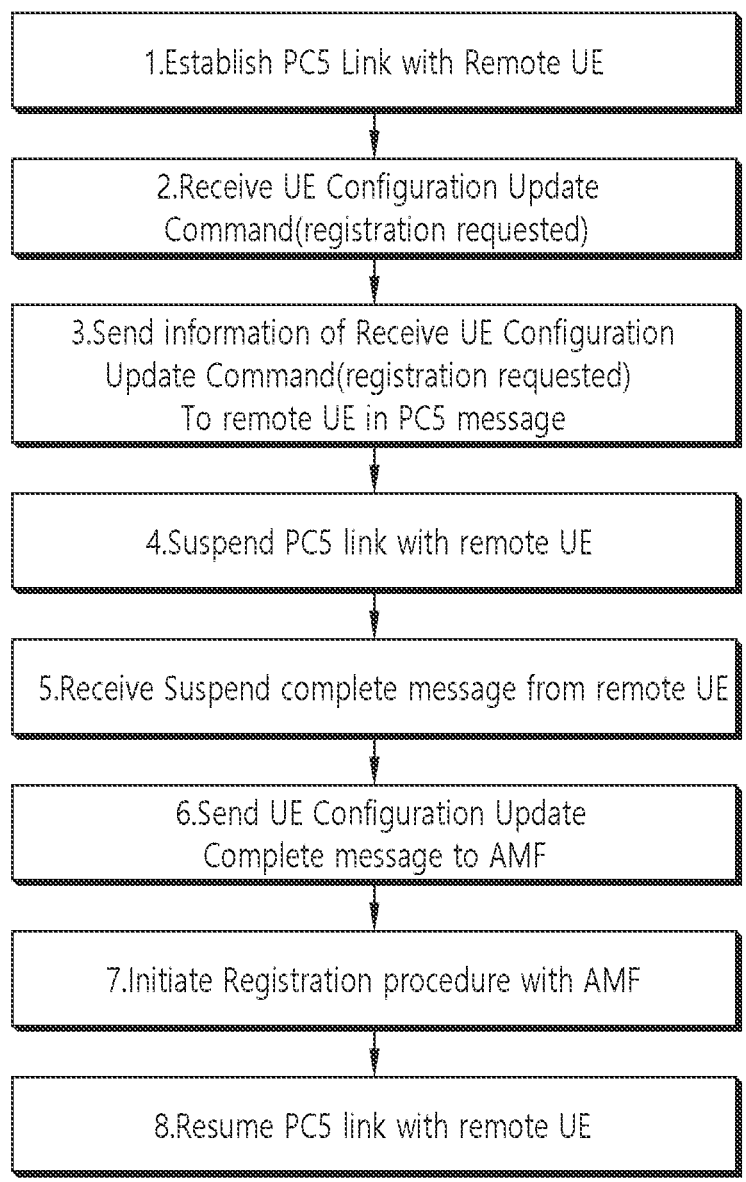
FIG. 10 shows a procedure of a Relay UE in the disclosure of this specification.

FIG. 10 shows a procedure of a Relay UE in the disclosure of this specification.

FIG. 10 specifically shows a procedure performed by the relay UE in the present disclosure.

The relay UE may be composed of a PC5 communication unit in charge of Prose communication and a Uu communication unit in charge of communication with the network. The Uu communication unit may include an upper layer and a physical layer of a modem in charge of communication through a Uu interface with a base station such as gNB/ng-eNB. The PC5 communication unit may include a physical layer of a modem in charge of communication with a plurality of remote UEs through a PC5 interface and an upper layer thereof. The upper layer may include both Layer 2 and Layer 3 of the OSI standard layer.

1) The Relay UE may establish the PC5 connection described with reference to FIGS. 7 and 8 with the remote UE.

2) The Relay UE may receive a UE Configuration Update Command from the AMF. Alternatively, the relay UE may transmit a registration request message to the AMF first.

In this case, the Uu communication unit of the relay UE may receive the request or the message. This process may be necessary for changing the slicing information of the UE or for other reasons. "Registration requested" information may be included in the UE Configuration Update (UCU) Command message received from the AMF. For example, there may be "registration requested" information by setting the value of the Registration requested bit to 1 among the contents of the configuration update indication IE in the NAS message Configuration update command message. Then, the Uu communication unit may transmit, to the PC5 communication unit, information indicating that the relay cannot be temporarily performed due to the re-registration procedure. The information may include information such as re-registration procedure execution, temporary interruption of relay, and entry into idle mode of the relay UE. When the PC5 communication unit receives information such as a re-registration request as described above, first, the PC5 communication unit may transmit response information for receiving information such as Ack to the Uu communication unit. The order of sending the Ack may be changed after step 5), which will be described later.

The operation between the Relay UE and the Remote UE in steps 3 to 5), which will be described later, may be performed before transmitting the UCU Complete message to be performed in step 6) after the Uu communication unit receives the UCU Command message, or may be proceed in parallel with the operation of sending the UCU Complete message to be performed in step 6) depending on the situation of the relay UE.

3) The PC5 communication unit of the relay UE may deliver, to all currently connected remote UEs, information that the UE-to-network relay operation is suspended. Such information may be transmitted through a PC5 message, and a message described in the conventional operation may be used or a newly defined message such as Direct Link Suspend may be utilized. The PC5 message may be a PC5-S or PC5-RRC message. The information may include one of the following information.

i) Reason why PC5 Connection is Suspended (PC5 Suspend Cause)

The PC5 interruption reason may include information that the PC5 connection is interrupted due to re-registration of the relay UE, and when connection interruption occurs for other reasons, information on the reason may be included in PC5 interruption reason.

ii) Suspend Time

The suspend time may optionally include information about a time when a connection interruption is expected. The information may generally be the form of a NAS timer defined in the NAS protocol, or may be designated as a newly defined coding or other form. By including information about the suspend time, the time range of temporary connection interruption is specified, and the remote UE can immediately attempt to resume the connection without a additional instruction after the time has elapsed. Alternatively, if the connection is not resumed until the time elapses, the remote UE may search for a new relay UE. As a result, interruption of service for the remote UE can be minimized.

iii) Updated Network Slice Information (New Allowed NSSAI, New Rejected NSSAI, Etc.)

When the re-registration procedure by the UCU procedure occurs due to the update of the NSSAI information, the updated network slice information may include the updated NSSAI information of the relay UE so that the remote UE may update the NSSAI information. That is, when a re-registration procedure is performed due to the update of Allowed NSSAI or Rejected NSSAI information of the relay UE, such update information may be included in information transmitted to the remote UE. While the remote UE is using a service after being assigned an allowed NSSAI, there may be a case where a specific S-NSSAI is no longer available. For example, the case may be a case where the NSSAI may be included in the rejected NSSAI or a case where the NSSAI may be removed from the allowed NSSAI.

The Remote UE may proceed with reselection of the relay UE according to whether NSSAI is required or not. Reselection may be based on user consent, and reselection may be determined in consideration of the service conditions of other S-NSSAI being used in addition to the above S-NSSAI. For example, if the service through another S-NSSAI is being provided, reselection may be performed after the service using the other S-NSSAI is completed. Alternatively, the remote UE may select the relay UE supporting the S-NSSAI again by preferentially considering the S-NSSAI. The remote UE that wants to proceed with reselection may release the current PC5 connection by proceeding with the LINK RELEASE procedure instead of sending information such as SUSPEND COMPLETE to the relay UE. Afterwards, the remote UE may establish a new PC5 connection again by searching for a new Relay UE. In this case, the following procedure may be omitted.

iv) Other Updated UE Configuration Information (e.g. Network Identity and Time Zone (NITZ), Etc.)

The configuration of the relay UE may be changed according to the UCU command message received by the relay UE. At this time, the relay UE may include this configuration change information in a message delivered to the remote UE. Information related to the service of the current relay UE (service area list, MICO indication, LADN information, CAG information, etc.) or information related to network configuration (network identities, time zone information, operator defined access category configuration information, etc.), among the configuration update information received by the relay UE, may be delivered to the Remote UE.

4) The relay UE may stop the PC5 connection with the remote UE.

5) The relay UE may receive a stop completion message from the remote UE. The PC5 communication unit of the Relay UE may receive the interruption completion message. When the PC5 communication unit of the Relay UE receives the SUSPEND COMPLETE message, it may be determined that suspending connections to all remote UEs is complete, or it may be determined that suspending connections to all remote UEs is completed after a certain period of time. Then, the PC5 communication unit may send a response (ack) to the reception of the information from the Uu communication unit described in step 2). Upon receiving the response, the Uu communication unit may transmit information to the NAS layer of the Relay UE. This may mean that data transmission or signaling of the Relay UE is temporarily stopped.

6) The NAS layer may send a CONFIGURATION UPDATE COMPLETE message to the AMF as a response (ack) to the UCU COMMAND received in the above scenario. Afterwards, the relay UE may switch to an idle mode.

7) The relay UE may perform a NAS signaling connection release and a registration procedure. In this case, the Relay UE may specify a Follow-on Request (FOR) value (set to 1) and transmit a registration request message to the network, so that the relay operation as a relay UE can be resumed immediately after the registration procedure.

8) After the registration procedure, the relay UE may resume the interrupted PC5 connection with the remote UE(s).

When the Uu communication unit of the Relay UE completes the registration procedure, that is, when the 5GMM state of the Relay UE becomes 5GMM-REGIS- TERED and the 5GS Update status becomes 5U1: UPDATED, the Uu communication unit of the UE may indicate that situation where relay to the PC5 communication unit is impossible is over. In this case, it may include information such as completion of a re-registration procedure, termination of temporary relay interruption, and entering or relaying of a connected mode of the Relay UE. When the PC5 communication unit receives such information from Uu, the PC5 communication unit may transmit response information (ack) in response to the information reception to the Uu communication unit. Alternatively, it may be replaced by resumption of data and signaling packet delivery, which will be described later, without a separate response (ack). As described above, during the registration procedure, the PC5 communication unit of the Relay UE may resume the interrupted PC5 connection by maintaining the CONNECTED state thereafter according to Follow On Request.

As a resume operation, the relay UE may inform that the disconnection to the Remote UEs is over. This may be delivered as a new PC5 message (e.g. LINK SUSPEND RESUME), or may be notified with new information (IE, etc.) in a conventional message.

As other resumption operation, when the relay UE transmits information such as the suspend time described in 3) ii) to the remote UE before the PC5 connection is stopped, the relay UE uses this to resume the PC5 connection without additional indication when the timer expires. The above operation may be performed even if the SUSPEND RESUME message is not received until the timer expires.

Figure 11:
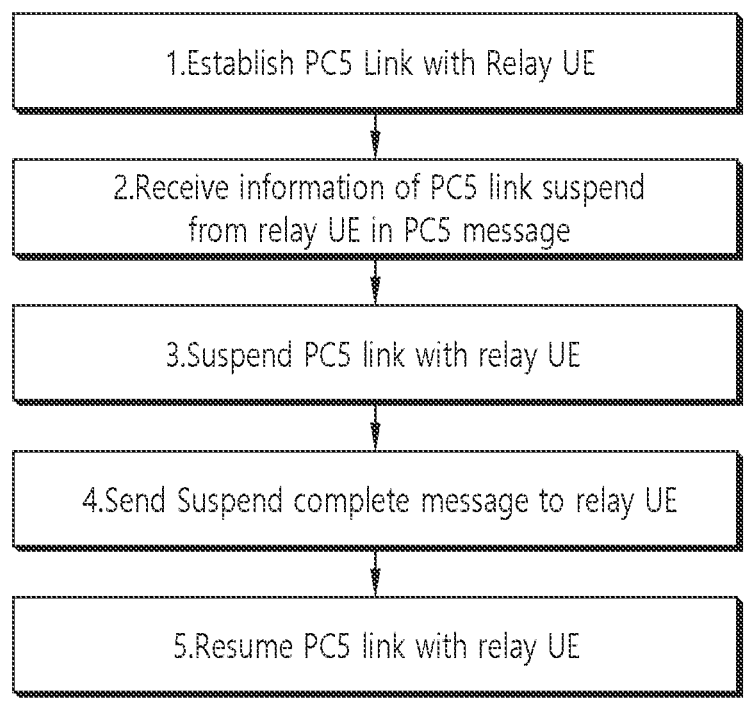
FIG. 11 shows a procedure of a Remote UE in the disclosure of this specification.

FIG. 11 shows a procedure of a Remote UE in the disclosure of this specification.

FIG. 11 specifically shows a procedure performed by a remote UE in the present disclosure.

1) The Remote UE may establish the PC5 connection described with reference to FIGS. 7 and 8 with the relay UE.

2) The remote UE may receive information that the UE-to-network relay operation for the remote UE is suspended from the PC5 communication unit of the relay UE. Such information may be transmitted through a PC5 message, a message described in the conventional operation or a newly defined message such as Direct Link Suspend. The PC5 message may be a PC5-S or PC5-RRC message. The information may include one of the following information.
  i) PC5 suspend cause
  ii) Suspend time
  iii) Updated network slice information (new allowed NSSAI, new rejected NSSAI, etc.)
  iv) Other updated UE configuration information (e.g. Network identity and time zone (NITZ), etc.)
  description about the above i), ii), iii) and iv) is the same as described in FIG. 10. When the Remote UE, which has established PC5 connection with the Relay UE, receives a message including the above-mentioned information, the remote UE may recognize that the PC5 connection with the relay UE is temporarily stopped. The Remote UE may switch the CM (Connection Management) state to a state differentiated from the conventional connection state. For example, the remote UE may switch to the CM-SUSPEND state. The Remote UE may temporarily suspend uplink signaling and transmission of user data. At this time, the remote UE may store the interrupted data and signaling in a temporary memory or buffer or queue located on the PC5 communication unit stack. That is, data or signaling transmitted to the top layer of the PC5 stack of the Remote UE may be temporarily stored in a separate temporary memory, buffer, or queue instead of being transmitted to the lower layer, and then data and signaling stored in temporary memory, buffer, or queue can be transmitted first when the PC5 connection is resumed. Instead of this buffering method, the operation of the remote UE may be similar to the conventional operation during RRC-INACTIVE or RRC suspend when the PC5 connection is suspended. That is, when the PC5 connection is suspended (Suspend), the Remote UE may store previous configuration information (band, id, etc.), and may reconnect by using the information when resuming the connection. When the suspend procedure is completed, the Remote UE may transmit information about this to the relay UE. The information may be sent in a message such as SUSPEND COMPLETE.

3) The remote UE may stop the PC5 connection with the relay UE.

4) The remote UE may transmit a stop completion message to the relay UE.

5) The remote UE may resume the interrupted PC5 connection with the relay UE. As a resume operation, the remote UE may receive a message indicating that the disconnection situation is over, from the Relay UE. The message may be received as a new PC5 message (e.g. LINK SUSPEND RESUME), or may be received as new information (IE, etc.) in a conventional message.

As another resuming operation, when the relay UE receives information such as the suspend time described in 3) ii) from the relay UE before the PC5 connection is stopped, the relay UE may resume the previous PC5 connection by using the information by regarding that disconnection situation is over without separate indication when a timer expires. In this case, if the connection fails, the Remote UE may suspend or release the connection and re-establish a connection with a new relay UE. The above operation may be performed even if the SUSPEND RESUME message is not received until the timer expires. Through this, when a connection problem actually occurs, the remote UE may reselect the relay UE after a certain period of time without waiting for a long time to resume.

In this way, the remote UE may know that the temporary connection interruption is terminated. The PC5 communication unit of the remote UE may transfer the data/signaling received from the upper layer in step 2) and stored in the temporary memory or buffer to the lower layer again. That is, packets stored in the buffer may be delivered to a lower layer (e.g. RRC layer, PDCP layer, Adaptation layer or RLC layer of the PC5 stack) for immediate transmission of the packets stored in the buffer.

The order in which the stored (or buffered) packets are delivered may be in the order in which they are stored in the buffer, that is, according to the FCFS (First come First Served) principle, or signaling may be prioritized over data. In this case, a temporary memory or buffer may be separately operated to separately store data and signaling in the PC5 communication unit of the remote UE.

When all the packets stored in the buffer are transmitted preferentially, data and signaling packets of the Remote UE that are generated later may be directly transmitted to the lower layer without being stored in the buffer separately. Alternatively, processing for packet stored in the buffer and processing for newly generated packets may be equally or simultaneously processed.

Optionally, a time stamp for a packet is recorded when storing the packet in the buffer, and the packet may be deleted from the buffer after a certain period of time has elapsed. This is to prevent a meaningless waste of resources, because the validity of the corresponding packet is decreased even if the packet is transmitted later when the relay interruption time is long. This may be determined based on a general re-transmission timer value in the case of signaling or a re-transmission timer value of an upper layer (IP, etc.) in the case of data. Alternatively, it may be determined based on QoS Flow information set in the PC5 link with the relay UE. If it is difficult to perform buffering because the PDB value required by the QoS Flow is small, the remote UE may release the related QoS Flows. In this process, the remote UE may inform the release information to the relay UE because it does not satisfy the QoS requirements due to interruption when releasing.

There may be cases in which necessary signaling must be exchanged between the Remote UE and the network (Periodic Registration, NAS Notification, Paging, etc.). In this case, if there is no response from the network to the UE, it may be determined that the UE is unreachable, and MT data may be lost. Therefore, in order to prevent this problem, the Relay AMF may inform the AMFs of the Remote UE that the service is going to be suspended for a while before delivering the UCU for re-registration after the relay UE enters the idle (IDLE) mode. In this case, information such as a timer may also be transmitted. When the Remote AMF receives this, the remote UE may hold for a while without sending signaling to be sent to the UE. Alternatively, a "temporary reject with cause" may be transmitted to the SMFs. The SMF may instruct the UPF to temporarily buffer the data in this case. Afterwards, when the timer expires or a message is received from the (new) AMF indicating that the service has been restarted, normal operation may be performed again.

Relay AMF may wait for a certain amount of time while notifying remote AMFs of service interruption. In this case, the remote AMF/SMF may transmit signaling (etc.) to the remote UEs to inform that the service is going to be temporarily stopped. At this time, the timer information received from the relay AMF may be used to inform which service is to be stopped. The UEs receiving this may notify the user through UIUX.

Reason why the relay AMF can determine/recognize the remote AMF is because when forming a relationship between the Relay UE and the Remote UE (or for forming a relationship), and an interaction with the network (e.g. for authentication/authorization) may be operated, at this time (or later), the Relay AMF, and additionally the Remote AMF, acquires the counterpart UE information (e.g. counterpart UE ID, temporary ID, serving AMF information, etc.) and stores it in the context of the serving UE. Alternatively, the serving AMF information of the counterpart UE may be acquired through UDM.

Figure 12:
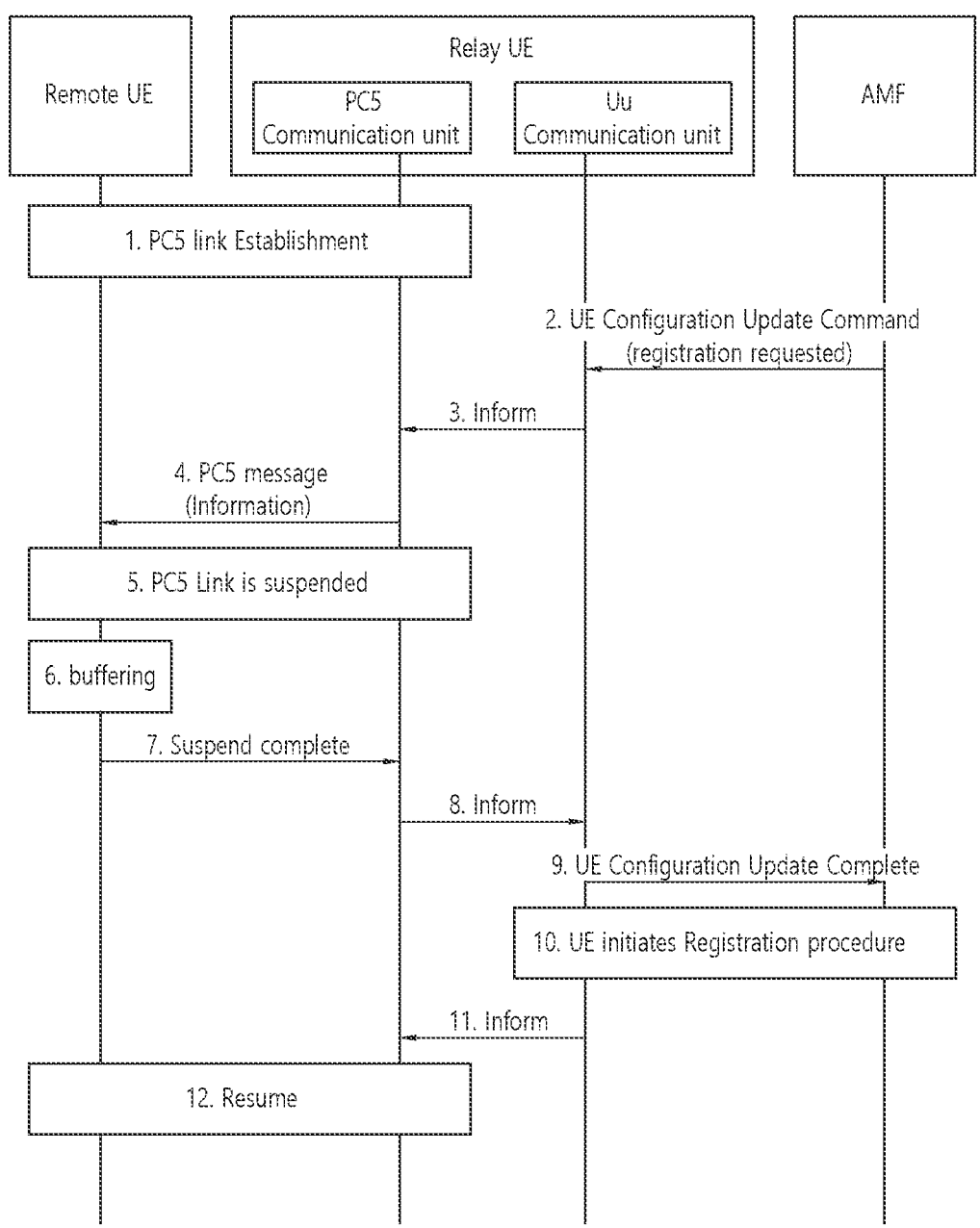
FIG. 12 shows an example of the disclosure.

FIG. 12 shows an example of the disclosure.

FIG. 12 shows a procedure performed by the remote UE, the relay UE, and the AMF in a situation in which re-registration of the relay UE is required.

1) First, since the remote UE and the relay UE are communicating such as signaling transmission using a Prose, the remote UE may have a PC5 link establishment with the relay UE.

2) The Relay UE may receive a UE Configuration Update Command from the AMF. Alternatively, the relay UE may transmit a registration request message to the AMF first.

There may be cases in which it is necessary to re-register the relay UE to the network due to a change in the slicing information of the UE or other reasons. Then, the network or the AMF may request the relay UE to re-register. In this way, the AMF may include "registration requested" information in the UE Configuration Update (UCU) Command message transmitted to the UE. For example, among the contents of the configuration update indication IE in the NAS message Configuration update command message, "registration requested" information may be transmitted by setting the value of the Registration requested bit to 1.

3) When the Uu communication unit of the Relay UE receives the "registration requested" information from the AMF, the Uu communication unit may transmit information to the PC5 communication unit indicating that relay is temporarily unavailable due to the re-registration procedure. The information may include information such as re-registration procedure execution, temporary interruption of relay, and entry into idle mode of the relay UE.

When the PC5 communication unit receives information such as a re-registration request as described above, first, the PC5 communication unit may transmit response information for receiving information such as ack to the Uu communication unit. The order of sending the ack may be changed after step 7), which will be described later.

The operation between the Relay UE and the Remote UE in steps 3)-7), which will be described later, is performed before transmitting the UCU Complete message to be performed in step 8) or is performed in parallel with operation of transmitting the UCU Complete message to be performed in step 8) depending on the situation of the relay UE 4) The PC5 communication unit of the relay UE may deliver information that the UE-to-network relay operation is suspended to all currently connected remote UEs. Such information may be transmitted through a PC5 message, and a message described in the conventional operation may be used or a newly defined message such as Direct Link Suspend may be used. The PC5 message may be a PC5-S or PC5-RRC message. The information may include one of the following information.

i) PC5 suspend cause
    ii) Suspend time
    iii) Updated network slice information (new allowed NSSAI, new rejected NSSAI, etc.)
    iv) Other updated terminal configuration information (eg, Network identity and time zone (NITZ), etc.)

Description of the above i), ii), iii) and iv) is the same as described in FIG. 10.

5)6) When the remote UE that has established PC5 connection with the relay UE receives a message including the above information, the remote UE may recognize that the PC5 connection with the relay UE is temporarily stopped. The remote UE may switch the CM (Connection Management) state to a state differentiated from the conventional connection state. For example, the remote UE may switch to the CM-SUSPEND state. The remote UE may temporarily suspend uplink signaling and transmission of user data. At this time, the remote UE may store the interrupted data and signaling in a temporary memory or buffer or queue located on the PC5 communication unit stack. That is, data or signaling transmitted to the top layer of the PC5 stack of the remote UE may be temporarily stored in a separate temporary memory, buffer, or queue instead of being transmitted to the lower layer, and then data and signaling stored in temporary memory, buffer, or queue can be transmitted first when the PC5 connection is resumed.

Instead of this buffering method, when the PC5 connection is suspended, the operation of the remote UE may be similar to the conventional operation during RRC-INACTIVE or RRC suspend. That is, when the PC5 connection is suspended, the remote UE may store previous configuration information (band, id, etc.), and reconnect using the information when resuming the connection. When the suspend procedure is completed, the remote UE may transmit information about this to the relay UE. The information may be sent in a message such as SUSPEND COMPLETE.

7) The remote UE may transmit a stop completion message to the relay UE.

The PC5 communication unit of the Relay UE may receive the interruption completion message. When the PC5 communication unit of the relay UE receives the suspend complete message, it may be determined that suspending connections to all remote UEs is completed, or it is determined that suspending connections to all remote UEs is completed after a certain period of time. can do.

8) Then, the PC5 communication unit may send a response (ack) to the reception of information from the Uu communication unit in step 3) described above. Upon receiving the response, the Uu communication unit may transmit information to the NAS layer of the relay UE. This may mean that data transmission or signaling of the Relay UE is temporarily stopped.

9) The NAS layer may send a CONFIGURATION UPDATE COMPLETE message to the AMF as a response (ack) to the UCU COMMAND received in the above scenario. Afterwards, the relay UE may switch to an idle mode.

10) The relay UE may perform a NAS signaling connection release and a registration procedure. In this case, the relay UE may specify a Follow-on Request (FOR) value (set to 1) and transmit a registration request message to the network, so that the relay operation as a relay UE can be resumed immediately after the registration procedure.

11) The Uu communication unit of the relay UE may notify the PC5 communication unit of the relay UE that the registration procedure has been completed.

12) relay UE may resume the interrupted PC5 connection with the remote UE (s).

When the Uu communication unit of the relay UE completes the registration procedure, that is, when the 5GMM state of the relay UE becomes 5GMM-REGISTERED and the 5GS Update status becomes 5U1: UPDATED, the Uu communication unit of the UE may inform the PC5 communication unit that situation where relay is impossible is over. In this case, it may include information such as completion of a re-registration procedure, termination of temporary relay interruption, and entering connected mode of the relay or relaying available. When the PC5 communication unit receives such information from Uu, the PC5 communication unit may transmit response information (ack) in response to the information reception to the Uu communication unit. Alternatively, it may be replaced by resumption of data and signaling packet delivery, which will be described later, without a separate response (ack). As described above, during the registration procedure, the PC5 communication unit of the relay UE may resume the interrupted PC5 connection by maintaining the CONNECTED state thereafter according to the Follow On Request.

As a resume operation, the relay UE may inform that the disconnection is released to the Remote UEs. This may be delivered as a new PC5 message (e.g. LINK SUSPEND RESUME), or may be notified with new information (IE, etc.) in a conventional message.

As another resuming action, when the relay UE delivers information such as the suspend time described in 3) ii) to the remote UE before the PC5 connection is interrupted, the relay UE uses this to resume PC5 connection by regarding connection stop situation is over without separate indication when timer expire. If the connection fails, the remote UE may suspend or release the connection and re-establish a connection with a new relay UE. The above operation may be performed even when the SUSPEND RESUME message is not received until the timer expires. Through this, when a connection problem actually occurs, the remote UE can reselect the relay UE after a certain period of time without waiting for a long time to resume.

In this way, the remote UE may know that the temporary connection interruption is terminated. The PC5 communication unit of the remote UE may transfer the data/signaling received from the upper layer in step 4) and the temporary memory or buffer to the lower layer again. That is, the packets stored in the buffer can be delivered to a lower layer (e.g. RRC layer, PDCP layer, Adaptation layer or RLC layer of the PC5 stack) for immediate transmission.

The order in which the stored (or buffered) packets are delivered may be in the order in which they are stored in the buffer, that is, according to the FCFS (First come First Served) principle, or signaling may be prioritized over data. In this case, a temporary memory or buffer may be separately performed to separately store data and signaling in the PC5 communication unit of the remote UE.

When all the packets stored in the buffer are transmitted preferentially, data and signaling packets of the Remote UE that are generated later may be directly transmitted to the lower layer without being stored in the buffer separately. Alternatively, packet processing stored in the buffer and processing of newly generated packets may be equally or simultaneously processed.

Optionally, a time stamp for a packet is recorded when storing in the buffer, and the packet may be deleted from the buffer after a certain period of time has elapsed. This is to prevent a meaningless waste of resources, because the validity of the corresponding packet is decreased even if the packet is transmitted later when the relay interruption time is long. This may be determined based on a general re-transmission timer value in the case of signaling or a re-transmission timer value of an upper layer (IP, etc.) in the case of data. Alternatively, it may be determined based on QoS Flow information set in the PC5 link with the relay UE. If it is difficult to perform buffering because the PDB value required by the QoS Flow is small, the remote UE may release the related QoS Flows. In this process, the remote UE may inform the relay UE of the release (release) information because it does not satisfy the QoS requirements due to interruption when releasing.

There may be cases in which necessary signaling must be exchanged between the Remote UE and the network (Periodic Registration, NAS Notification, Paging, etc.). In this case, if there is no response from the network to the UE, it may be determined that the UE is unreachable, and MT data may be lost. Therefore, in order to prevent this problem, the Relay AMF may inform the AMFs of the Remote UE that the service is going to be suspended for a while before delivering the UCU for re-registration after the relay UE enters the idle (IDLE) mode. In this case, information such as a timer may also be transmitted. When the Remote AMF receives this, the remote UE may hold for a while without sending signaling to be sent to the UE. Alternatively, a "temporary reject with cause" may be transmitted to the SMFs. The SMF may instruct the UPF to temporarily buffer the data in this case. Afterwards, when the timer expires or a message is received from the (new) AMF indicating that the service has been restarted, normal operation may be performed again.

Relay AMF may wait for a certain amount of time while notifying remote AMFs of service interruption. In this case, the remote AMF/SMF may transmit signaling (etc.) to the remote UEs to inform that the service is going to be temporarily stopped. At this time, the timer information received from the relay AMF may be used to inform which service is to be stopped. The UEs receiving this may notify the user through UIUX.

Reason why the relay AMF can determine/recognize the remote AMF is because when forming a relationship between the Relay UE and the Remote UE (or for forming a relationship), and an interaction with the network (e.g. for authentication/authorization) may be operated, at this time (or later), the Relay AMF, and additionally the Remote AMF, acquires the counterpart UE information (e.g. counterpart UE ID, temporary ID, serving AMF information, etc.) and stores it in the context of the serving UE. Alternatively, the serving AMF information of the counterpart UE may be acquired through UDM.

For reference, the operation of the UE (e.g. remote UE or relay UE) described in this specification may be implemented by the apparatus of FIGS. 11 to 15 to be described below. For example, the terminal (e.g. remote UE or relay UE) may be the first device 100a or the second device 100b of FIG. 12. For example, an operation of a terminal (e.g. a Remote UE or a Relay UE) described herein may be processed by one or more processors 1020a or 1020b. The operations of the UE described herein may be stored in one or more memories 1010a or 1010b in the form of instructions/programs (e.g. instructions, executable code) executable by one or more processors 1020a or 1020b. One or more processors 1020a or 1020b control one or more memories 1010a or 1010b and one or more transceivers 1031a or 1031b, and execute instructions/programs stored in one or more memories 1010a or 1010b as disclosed herein. It is possible to perform the operation of the terminal (e.g. UE) described in this specification.

In addition, instructions for performing an operation of a terminal (e.g. a remote UE or a relay UE) described in the disclosure of the present specification may be stored in a non-volatile computer-readable storage medium in which it is recorded. The storage medium may be included in one or more memories 1010a or 1010b. And, the instructions recorded in the storage medium may be executed by one or more processors 1020a or 1020b to perform the operation of the terminal (e.g. Remote UE or Relay UE) described in the disclosure of the present specification.

For reference, the operation of a network node (e.g. AMF, SMF, UPF, UDM, DN, NG-RAN, DN-AAA server, RAUSF, etc.) or a base station (e.g. NG-RAN, gNB, eNB, etc.) described herein may be implemented by the apparatus of FIGS. 11 to 15 which will be described below. For example, the network node may be the first device 100a or the second device 100b of FIG. 12. For example, the operation of the network node described herein may be processed by one or more processors 1020a or 1020b. The operations of the network node or base station described herein may be stored in one or more memories 1010a or 1010b in the form of instructions/programs (e.g. instruction, executable code) executable by one or more processors 1020a or 1020b. One or more processors 1020a or 1020b control one or more memories 1010a or 1010b and one or more transceivers 1031a or 1031b, and execute instructions/programs stored in one or more memories 1010a or 1010b as disclosed herein. It is possible to perform the operation of the network node or the base station described in this specification.

IV. Examples to which the Disclosure of the Present Specification Applies

Although not limited thereto, the various descriptions, functions, procedures, suggestions, methods, and/or flow charts of the disclosure of the present specification disclosed may be applied in various fields requiring wireless communication/connection (e.g. 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 13:
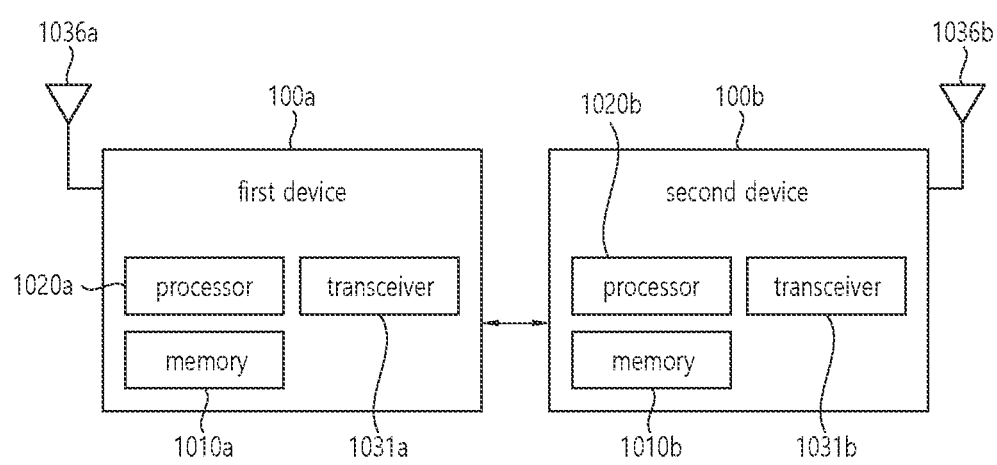
FIG. 13 illustrates a wireless communication system according to an embodiment.

FIG. 13 illustrates a wireless communication system according to an embodiment.

Referring to FIG. 13, a wireless communication system may include a first device 100a and a second device 100b. The first device 100a and the second device 100b may be wireless communication devices capable of performing wireless communication.

The first device (100a) may be the UE described in the disclosure of this specification. Alternatively, the first device (100a) may be a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The second device (100b) may be a network node (eg, AMF or MME) described in the disclosure of this specification. Alternatively, the second device (100b) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

For example, the UE 100 includes a mobile phone, a smart phone, a laptop computer, a UE device for digital broadcasting, personal digital assistants (PDA), a portable multimedia player (PMP), a navigation system, and a slate PC (slate). PC, tablet PC, ultrabook, wearable device (e.g., watch-type UE device (smartwatch), glass-type UE device (smart glass), HMD (head mounted display)) and the like. For example, the HMD may be a display device worn on the head. For example, an HMD may be used to implement VR, AR or MR.

For example, the drone may be a flying vehicle that does not have a human and flies by a wireless control signal. For example, the VR device may include a device that implements an object or a background of a virtual world. For example, the AR device may include a device implemented by connecting an object or background of the virtual world to an object or background of the real world. For example, the MR device may include a device that implements a virtual world object or background by fusion with a real world object or background. For example, the hologram device may include a device for realizing a 360-degree stereoscopic image by recording and reproducing stereoscopic information by utilizing an interference phenomenon of light generated by the meeting of two laser beams called holography. For example, the public safety device may include an image relay device or an image device that can be worn on a user's body. For example, the MTC device and the IoT device may be devices that do not require direct human intervention or manipulation. For example, the MTC device and the IoT device may include a smart meter, a bending machine, a thermometer, a smart light bulb, a door lock, or various sensors. For example, a medical device may be a device used for the purpose of diagnosing, treating, alleviating, treating, or preventing a disease. For example, a medical device may be a device used for the purpose of diagnosing, treating, alleviating or correcting an injury or disorder. For example, a medical device may be a device used for the purpose of examining, replacing, or modifying structure or function. For example, the medical device may be a device used for the purpose of controlling pregnancy. For example, the medical device may include a medical device, a surgical device, an (ex vivo) diagnostic device, a hearing aid, or a device for a procedure. For example, the security device may be a device installed to prevent a risk that may occur and maintain safety. For example, the security device may be a camera, CCTV, recorder or black box. For example, the fintech device may be a device capable of providing financial services such as mobile payment. For example, the fintech device may include a payment device or a Point of Sales (POS). For example, the climate/environment device may include a device for monitoring or predicting the climate/environment.

The first device (100a) includes at least one processor, such as a processor (1020a), and at least one memory, such as a memory (1010a), it may include at least one transceiver, such as transceiver (1031a). The processor (1020a) may perform the functions, procedures, and/or methods described above. The processor (1020a) may perform one or more protocols. For example, the processor (1020a) may perform one or more layers of an air interface protocol. The memory (1010a) is connected to the processor (1020a) and may store various types of information and/or commands. The transceiver (1031a) may be connected to the processor (1020a) and may be controlled to transmit/receive a wireless signal.

The second device (100b) may include at least one processor such as a processor (1020b), at least one memory device such as a memory (1010b), and at least one transceiver such as a transceiver (1031b). The processor (1020b) may perform the functions, procedures, and/or methods described above. The processor (1020b) may implement one or more protocols. For example, the processor (1020b) may implement one or more layers of an air interface protocol. The memory (1010b) is connected to the processor (1020b) and may store various types of information and/or commands. The transceiver (1031b) may be connected to the processor (1020b) and may be controlled to transmit/receive a wireless signal.

The memory (1010a) and/or the memory (1010b) may be respectively connected inside or outside the processor (1020a) and/or the processor (1020b), and may be connected to other processors through various technologies such as wired or wireless connection.

The first device (100a) and/or the second device (100b) may have one or more antennas. For example, antenna (1036a) and/or antenna (1036b) may be configured to transmit and receive wireless signals.

Figure 14:
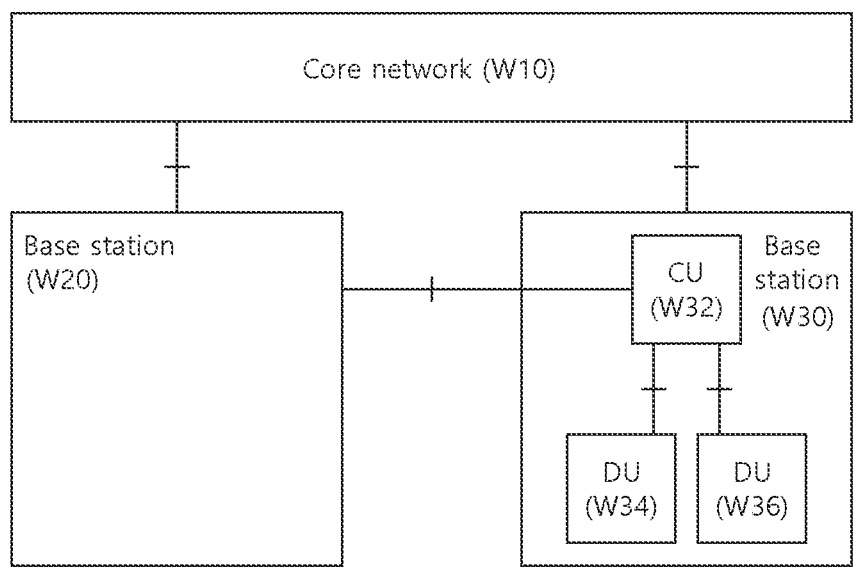
FIG. 14 illustrates a block diagram of a network node according to an embodiment.

FIG. 14 illustrates a block diagram of a network node according to an embodiment.

In particular, FIG. 14 is a diagram illustrating in detail a case in which a base station is divided into a central unit (CU) and a distributed unit (DU).

Referring to FIG. 14, base stations W20 and W30 may be connected to the core network W10, and the base station W30 may be connected to a neighboring base station W20. For example, the interface between the base stations W20 and W30 and the core network W10 may be referred to as NG, and the interface between the base station W30 and the neighboring base station W20 may be referred to as Xn.

The base station W30 may be divided into CUs W32 and DUs W34 and W36. That is, the base station W30 may be hierarchically separated and operated. The CU W32 may be connected to one or more DUs W34 and W36, for example, an interface between the CU W32 and the DUs W34 and W36 may be referred to as F1. The CU (W32) may perform functions of upper layers of the base station, and the DUs (W34, W36) may perform functions of lower layers of the base station. For example, the CU W32 is a radio resource control (RRC), service data adaptation protocol (SDAP), and packet data convergence protocol (PDCP) layer of a base station (e.g., gNB) hosting a logical node, and the DUs W34 and W36 may be logical nodes hosting radio link control (RLC), media access control (MAC), and physical (PHY) layers of the base station. Alternatively, the CU W32 may be a logical node hosting the RRC and PDCP layers of the base station (e.g., en-gNB).

The operation of the DUs W34 and W36 may be partially controlled by the CU W32. One DU (W34, W36) may support one or more cells. One cell can be supported by only one DU (W34, W36). One DU (W34, W36) may be connected to one CU (W32), and by appropriate implementation, one DU (W34, W36) may be connected to a plurality of CUs.

Figure 15:
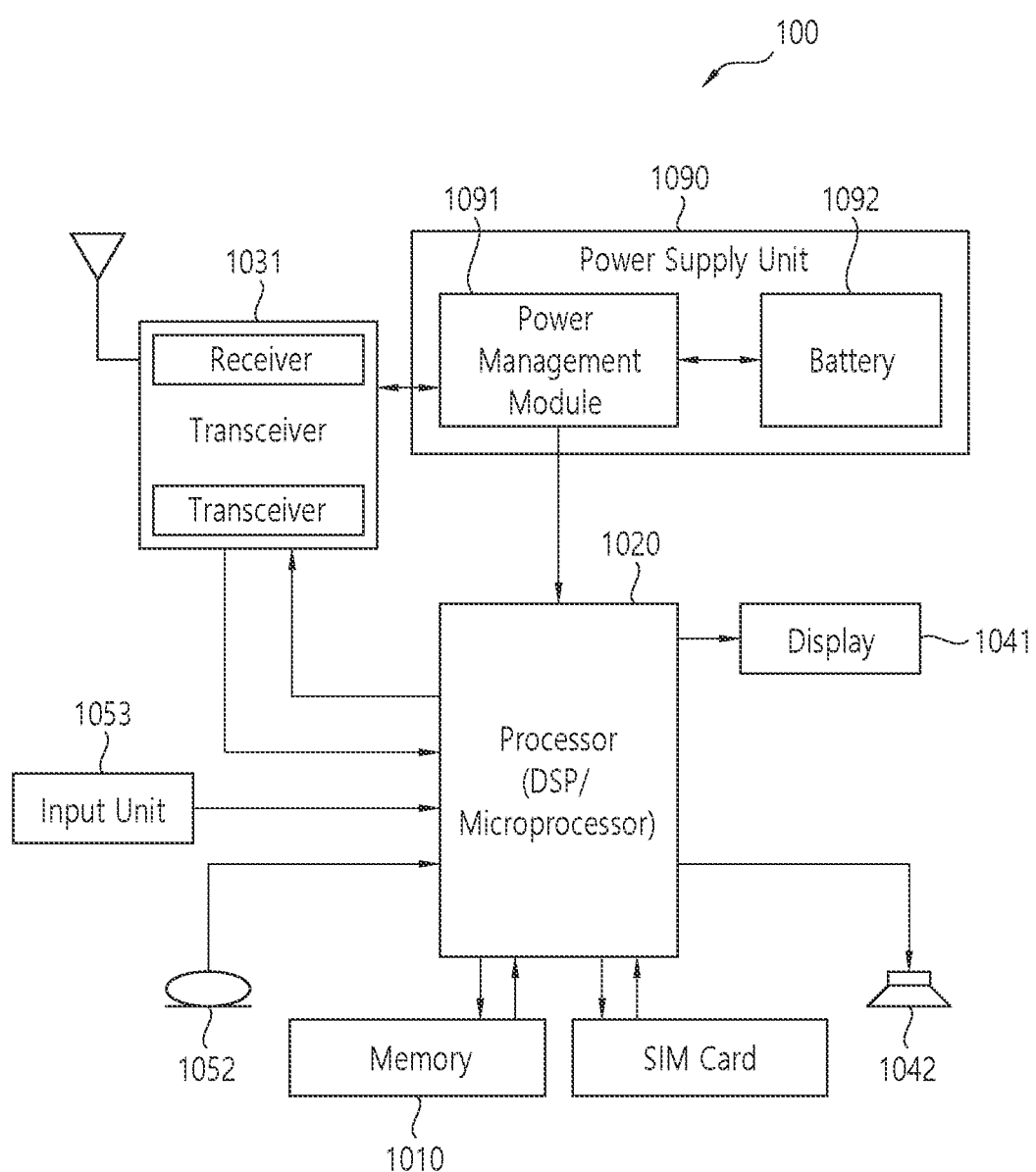
FIG. 15 is a block diagram illustrating the configuration of the UE 100 according to an embodiment.

FIG. 15 is a block diagram illustrating the configuration of the UE 100 according to an embodiment.

In particular, the UE 100 illustrated in FIG. 15 is a diagram illustrating the first apparatus of FIG. 13 in more detail.

The UE 100 includes a memory 1010, a processor 1020, a transceiver 1031, a power management module 1091, a battery 1092, a display 1041, an input unit 1053, a speaker 1042, and a microphone (1052), a subscriber identification module (SIM) card, and one or more antennas.

The processor (1020) may be configured to implement the proposed functions, procedures and/or methods described herein. The layers of the air interface protocol may be implemented in the processor (1020). The processor (1020) may include an application-specific integrated circuit (ASIC), other chipsets, logic circuits, and/or data processing devices. The processor (1020) may be an AP (application processor). The processor (1020) may include at least one of a DSP (digital signal processor), a CPU (central processing unit), a GPU (graphics processing unit), and a modem (modulator and demodulator). Examples of processor (1020) include SNAPDRAGON™ series processors manufactured by Qualcomm®, EXYNOS™ series processors manufactured by Samsung®, A series processors manufactured by Apple®, HELIO™ series processors manufactured by MediaTek®, ATOM™ series processor manufactured by INTEL® or a corresponding next-generation processor.

The power management module (1091) manages power for the processor (1020) and/or the transceiver (1031). The battery (1092) supplies power to the power management module (1091). The display (1041) outputs the result processed by the processor (1020). Input (1053) receives input to be used by processor (1020). The input unit (1053) may be displayed on the display (1041). A SIM card is an integrated circuit used to securely store an IMSI (international mobile subscriber identity) and associated keys used to identify and authenticate subscribers in mobile phone devices such as mobile phones and computers. Many SIM cards can also store contact information.

The memory (1010) is operatively coupled to the processor (1020), and stores various information for operating the processor (610). Memory (1010) may include ROM (read-only memory), RAM (random access memory), flash memory, memory cards, storage media, and/or other storage devices. When the embodiment is implemented in software, the techniques described in this specification may be implemented in modules (eg, procedures, functions, etc.) that perform the functions described in this specification. Modules may be stored in memory (1010) and executed by processor (1020). The memory (1010) may be implemented inside the processor (1020). Alternatively, the memory (1010) may be implemented outside the processor (1020), and may be communicatively connected to the processor (1020) through various means known in the art.

The transceiver (1031) is operatively coupled to the processor (1020) and transmits and/or receives a radio signal. The transceiver (1031) includes a transmitter and a receiver. The transceiver (1031) may include a baseband circuit for processing a radio frequency signal. The transceiver controls one or more antennas to transmit and/or receive radio signals. The processor (1020) transmits command information to the transceiver (1031) to transmit, for example, a radio signal constituting voice communication data to initiate communication. The antenna functions to transmit and receive radio signals. When receiving a wireless signal, the transceiver (1031) may transmit the signal for processing by the processor (1020) and convert the signal to a baseband. The processed signal may be converted into audible or readable information output through the speaker (1042).

The speaker (1042) outputs sound related results processed by the processor (1020). Microphone (1052) receives sound related input to be used by processor (1020).

The user inputs command information such as a phone number by, for example, pressing (or touching) a button of the input unit (1053) or voice activation using the microphone (1052). The processor (1020) receives such command information and processes it to perform an appropriate function, such as making a call to a phone number. Operational data may be extracted from the SIM card or the memory (1010). In addition, the processor (1020) may display command information or display information on the display (1041) for the user to recognize and for convenience.

Figure 16:
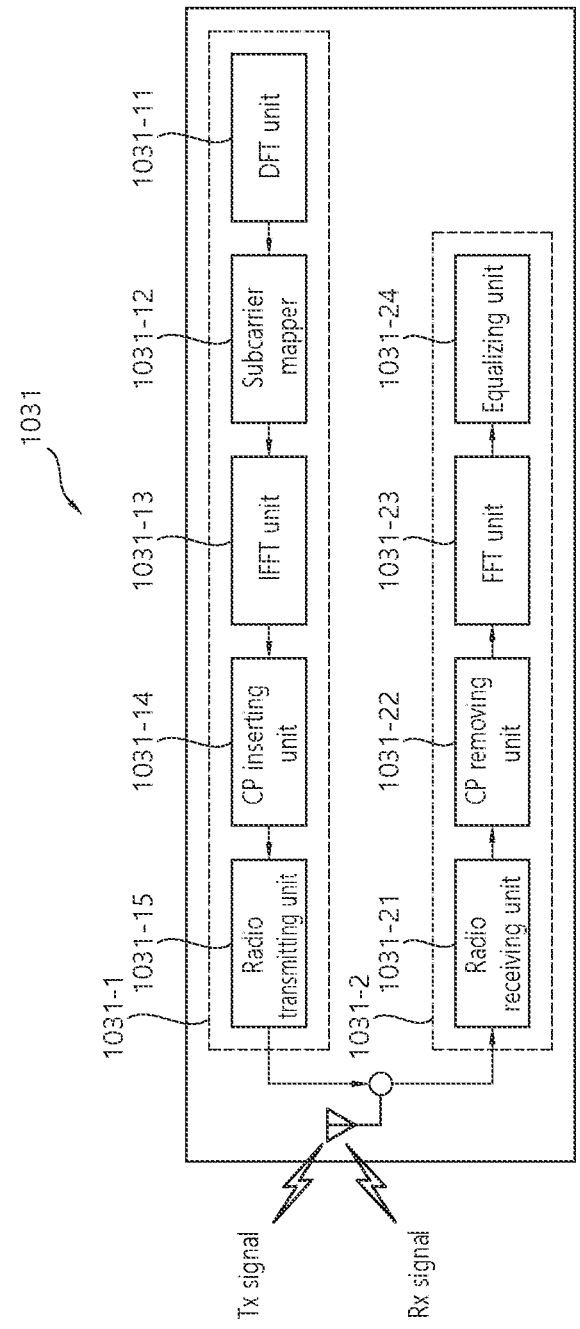
FIG. 16 is a detailed block diagram illustrating the transceiver of the first device shown in FIG. 13 or the transceiver of the device shown in FIG. 15 in detail.

FIG. 16 is a detailed block diagram illustrating the transceiver of the first device shown in FIG. 13 or the transceiver of the device shown in FIG. 15 in detail.

Referring to FIG. 16, the transceiver (1031) includes a transmitter (1031-1) and a receiver (1031-2). The transmitter (1031-1) includes a Discrete Fourier Transform (DFT) unit (1031-11), a subcarrier mapper (1031-12), an IFFT unit (1031-13) and a CP insertion unit (1031-14), and a wireless transmitter (1031-15). The transmitter (1031-1) may further include a modulator. In addition, for example, a scramble unit (not shown; scramble unit), a modulation mapper (not shown; modulation mapper), a layer mapper (not shown; layer mapper) and a layer permutator (not shown; layer permutator) may be further included, this may be disposed before the DFT unit (1031-11). That is, in order to prevent an increase in PAPR (peak-to-average power ratio), the transmitter (1031-1) passes information through the DFT (1031-11) before mapping a signal to a subcarrier. After subcarrier mapping is performed on the signal spread (or precoded in the same sense) by the DFT unit (1031-11) through the subcarrier mapper (1031-12), an IFFT (Inverse Fast Fourier Transform) unit (1031-13) to make it a signal on the time axis.

The DFT unit (1031-11) outputs complex-valued symbols by performing DFT on input symbols. For example, when Ntx symbols are input (however, Ntx is a natural number), the DFT size is Ntx. The DFT unit (1031-11) may be called a transform precoder. The subcarrier mapper (1031-12) maps the complex symbols to each subcarrier in the frequency domain. The complex symbols may be mapped to resource elements corresponding to resource blocks allocated for data transmission. The subcarrier mapper (1031-12) may be referred to as a resource element mapper. The IFFT unit (1031-13) outputs a baseband signal for data that is a time domain signal by performing IFFT on an input symbol. The CP insertion unit (1031-14) copies a part of the rear part of the base band signal for data and inserts it into the front part of the base band signal for data. ISI (Inter-symbol interference) and ICI (Inter-Carrier Interference) are prevented through CP insertion, so that orthogonality can be maintained even in a multi-path channel.

On the other hand, the receiver (1031-2) includes a radio receiver (1031-21), a CP remover (1031-22), an FFT unit (1031-23), and an equalizer (1031-24). The radio receiving unit (1031-21), the CP removing unit (1031-22), and the FFT unit (1031-23) of the receiver (1031-2) include the radio transmitting unit (1031-15) in the transmitting end (1031-1), it performs the reverse function of the CP insertion unit (1031-14) and the IFF unit (1031-13). The receiver (1031-2) may further include a demodulator.

Figure 17:
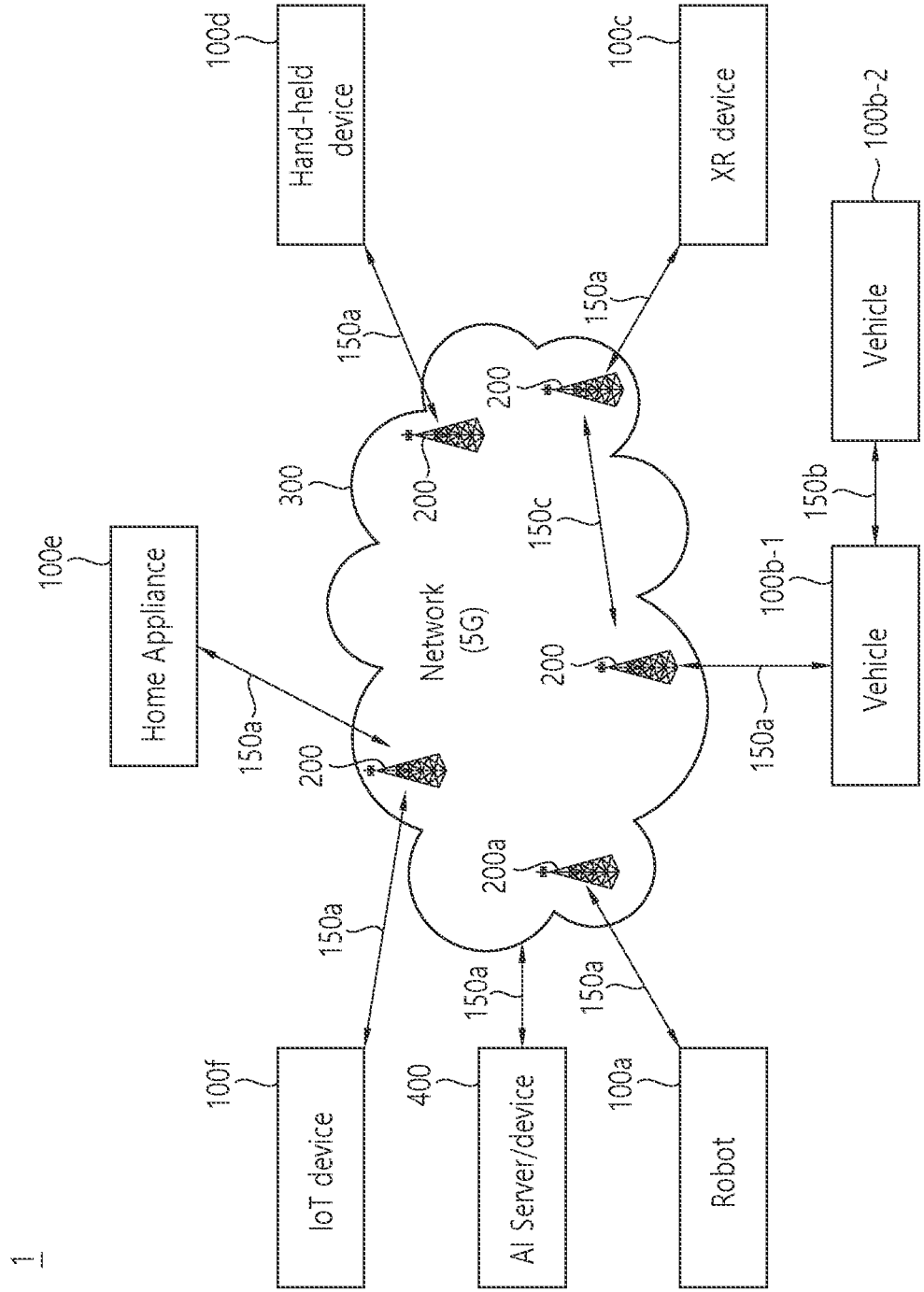
FIG. 17 illustrates a communication system 1 applied to the disclosure of the present specification.

FIG. 17 illustrates a communication system 1 applied to the disclosure of the present specification.

Referring to FIG. 17, a communication system (1) applied to the disclosure of the present specification includes a wireless device, a base station, and a network. Here, the wireless device may mean a device that performs communication using a wireless access technology (e.g. 5G NR (New RAT), LTE (Long Term Evolution)), and may be referred to as a communication/wireless/5G device. Although not limited thereto, the wireless device may include a robot (100a), a vehicle (100b-1, 100b-2), an XR (eXtended Reality) device (100c), a hand-held device (100d, and a home appliance (100e), an IoT (Internet of Thing) device (1000, and an AI device/server (400). For example, the vehicle may include a vehicle equipped with a wireless communication function, an autonomous driving vehicle, a vehicle capable of performing inter-vehicle communication, and the like. Here, the vehicle may include an UAV (Unmanned Aerial Vehicle) (e.g. a drone). XR devices include AR (Augmented Reality)/VR (Virtual Reality)/MR (Mixed Reality) devices, and include an HMD (Head-Mounted Device), a HUD (Head-Up Display) provided in a vehicle, a television, a smartphone, may be implemented in the form of a computer, a wearable device, a home appliance, a digital signage, a vehicle, a robot, and the like. The portable device may include a smart phone, a smart pad, a wearable device (e.g. a smart watch, smart glasses), a computer (e.g. a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device (200a) may operate as a base station/network node to other wireless devices.

Here, the wireless communication technology implemented in the wireless devices 100a to 100f, 400, and 100 and 200 of FIG. 15 of the present specification may include LTE, NR, and 6G as well as the narrowband Internet of Things for low-power communication. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100a to 100f and 400 of the present specification and 100 and 200 in FIG. 12 may perform communication based on the LTE-M technology. In this case, as an example, the LTE-M technology may be an example of an LPWAN technology, and may be called by various names such as enhanced machine type communication (eMTC). For example, LTE-M technology is 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) may be implemented in at least one of various standards such as LTE M, and is not limited to the above-described name. Additionally or alternatively, the wireless communication technology implemented in the wireless devices 100a to 100f and 400 of the present specification, and 100 and 200 in FIG. 15 may include at least any one of ZigBee, Bluetooth, and Low Power Wide Area Network (Low) in consideration of low power communication. Power Wide Area Network (LPWAN), but is not limited to the above-described name. For example, the ZigBee technology can create PAN (personal area networks) related to small/low-power digital communication based on various standards such as IEEE 802.15.4, and may be called by various names.

The wireless devices (100a-100f) may be connected to the network (300) through the base station (200). AI (Artificial Intelligence) technology may be applied to the wireless devices (100a-100f), and the wireless devices (100a-100f) may be connected to the AI server (400) through the network (300). The network (300) may be configured using a 3G network, a 4G (e.g. LTE) network, or a 5G (e.g. NR) network. The wireless devices (100a-100f) may communicate with each other through the base station (200)/network (300), but may also communicate directly (e.g. sidelink communication) without passing through the base station/network. For example, the vehicles (100b-1, 100b-2) may perform direct communication (e.g. Vehicle to Vehicle (V2V)/Vehicle to everything (V2X) communication). In addition, the IoT device (e.g. sensor) may directly communicate with other IoT devices (e.g. sensor) or other wireless devices (100a-100f).

Wireless communication/connection (150a, 150b, and 150c) may be performed between the wireless devices (100a-100f)/base station (200) and the base station (200)/base station (200). Here, the wireless communication/connection includes uplink/downlink communication (150a) and sidelink communication (150b) (or D2D communication), and communication between base stations (150c) (e.g. relay, IAB (Integrated Access Backhaul)). This can be done through technology (e.g. 5G NR) Wireless communication/connection (150a, 150b, 150c) allows the wireless device and the base station/radio device, and the base station and the base station to transmit/receive wireless signals to each other. For example, the wireless communication/connection (150a, 150b, and 150c) may transmit/receive a signal through various physical channels. To this end, based on various proposals of the present specification, at least some of various configuration information setting process for transmission/reception of a wireless signal (e.g. channel encoding/decoding, modulation/demodulation, resource mapping/demapping, etc.), resource allocation process and etc. may be performed.

The present specification may have various effects.

For example, through the procedure disclosed in this specification, even if the UEs using the UE to Network Relay in the 5G system are temporarily unable to operate the relay due to the re-registration of the relay UE, the user experience of the remote UE is improved. the user experience may be maintained above a certain level.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. have. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method for performing communication by a relay UE, comprising:
receiving, from an Access and Mobility Management Function (AMF), UE Configuration Update Command message including information requesting registration for the relay UE;
transmitting, to a remote UE, an instructing message to suspend PC5 connection;
receiving, from the remote UE, a message indicating that suspension of the PC5 connection is complete;

transmitting, to the AMF, UE Configuration Update Complete message in response to the UE Configuration Update Command message;
performing a registration procedure with the AMF; and
resuming PC5 connection with the remote UE.

2. The method of claim 1,
wherein the UE Configuration Update Command message includes updated configuration information for the relay UE.

3. The method of claim 1,
wherein the instructing message to suspend PC5 connection includes information on cause of suspension.

4. The method of claim 1,
wherein the instructing message to suspend PC5 connection includes information on suspension duration time.

5. The method of claim 4,
wherein the step of resuming PC5 connection with the remote UE is performed when the suspension duration elapses after transmitting the instructing message to suspend PC5 connection.

6. The method of claim 1,
wherein the instructing message to suspend PC5 connection includes updated network slice information.

7. The method of claim 1,
wherein the registration procedure is comprising:
transmitting, to the AMF, registration request message including Follow-on Request (FOR) value.

8. The method of claim 1, further comprising:
transmitting, to the remote UE, a message informing that the suspension of the PC5 connection is over, after the registration procedure is complete.

9. A relay UE to perform communication, comprising:
a transceiver; and
a processor,
wherein the processor receives, from an Access and Mobility Management Function (AMF), UE Configuration Update Command message including information requesting registration for the relay UE;
wherein the processor transmits, to a remote UE, an instructing message to suspend PC5 connection;
wherein the processor receives, from the remote UE, a message indicating that suspension of the PC5 connection is complete;
wherein the processor transmits, to the AMF, UE Configuration Update Complete message in response to the UE Configuration Update Command message;
wherein the processor performs a registration procedure with the AMF; and
wherein the processor resumes PC5 connection with the remote UE.

10. An apparatus for a relay user equipment (UE) to perform communication, the apparatus comprising: at least one processor; and at least one computer memory operably connected to the at least one processor and configured to store instructions that, when executed, cause the at least one processor to perform operations comprising:
receiving, from an Access and Mobility Management Function (AMF), UE Configuration Update Command message including information requesting registration for the relay UE;
transmitting, to a remote UE, an instructing message to suspend PC5 connection;
receiving, from the remote UE, a message indicating that suspension of the PC5 connection is complete;
transmitting, to the AMF, UE Configuration Update Complete message in response to the UE Configuration Update Command message;
performing a registration procedure with the AMF; and
resuming PC5 connection with the remote UE.

11. The apparatus of claim 10,
wherein the UE Configuration Update Command message includes updated configuration information for the relay UE.

12. The apparatus of claim 10,
wherein the instructing message to suspend PC5 connection includes information on cause of suspension.

13. The apparatus of claim 10,
wherein the instructing message to suspend PC5 connection includes information on suspension duration time.

14. The apparatus of claim 13,
wherein the step of resuming PC5 connection with the remote UE is performed when the suspension duration elapses after transmitting the instructing message to suspend PC5 connection.

15. The apparatus of claim 10,
wherein the instructing message to suspend PC5 connection includes updated network slice information.

16. The apparatus of claim 10,
wherein the registration procedure is comprising:
transmitting, to the AMF, registration request message including Follow-on Request (FOR) value.

17. The apparatus of claim 10, further comprising:
transmitting, to the remote UE, a message informing that the suspension of the PC5 connection is over, after the registration procedure is complete.

\* \* \* \* \*